United States Patent
Mizusaki

(10) Patent No.: US 10,160,910 B2
(45) Date of Patent: Dec. 25, 2018

(54) ALIGNMENT FILM AND LIQUID CRYSTAL DISPLAY DEVICE

(71) Applicant: Sharp Kabushiki Kaisha, Sakai, Osaka (JP)

(72) Inventor: Masanobu Mizusaki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/515,288

(22) PCT Filed: Sep. 24, 2015

(86) PCT No.: PCT/JP2015/076845
§ 371 (c)(1),
(2) Date: Mar. 29, 2017

(87) PCT Pub. No.: WO2016/052285
PCT Pub. Date: Apr. 7, 2016

(65) Prior Publication Data
US 2017/0218272 A1    Aug. 3, 2017

(30) Foreign Application Priority Data
Sep. 30, 2014 (JP) .................. 2014-201286

(51) Int. Cl.
*C09K 19/56* (2006.01)
*C08G 73/10* (2006.01)
(Continued)

(52) U.S. Cl.
CPC .............. *C09K 19/56* (2013.01); *B32B 27/06* (2013.01); *B32B 27/281* (2013.01); *C08G 73/10* (2013.01);
(Continued)

(58) Field of Classification Search
CPC ... C09K 19/56; G02F 1/133723; B32B 27/06; B32B 27/281; B32B 2457/202;
(Continued)

(56) References Cited

U.S. PATENT DOCUMENTS

2008/0069974 A1  3/2008  Shin
2010/0085523 A1  4/2010  Terashita et al.
2013/0107149 A1  5/2013  Terashita et al.

FOREIGN PATENT DOCUMENTS

JP        06-308503      * 11/1994
JP        06-308503 A      11/1994
(Continued)

OTHER PUBLICATIONS

Official Communication issued in International Patent Application No. PCT/JP2015/076845, dated Dec. 8, 2015.

*Primary Examiner* — Ruiyun Zhang
(74) *Attorney, Agent, or Firm* — Keating & Bennett, LLP

(57) ABSTRACT

An alignment film includes a copolymer containing a repeating structural unit represented by the following formula (1), wherein X1 and X2 may be the same as or different from each other and are each represented by any one of several formulas; and Y is represented by any one of several formulas (Continued)

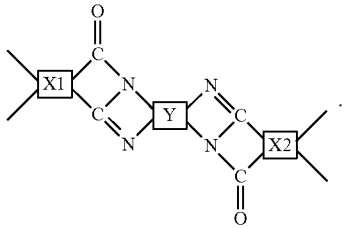

9 Claims, 2 Drawing Sheets

(51) Int. Cl.
*C08G 73/18* (2006.01)
*B32B 27/06* (2006.01)
*B32B 27/28* (2006.01)
*G02F 1/1337* (2006.01)

(52) U.S. Cl.
CPC ....... *C08G 73/105* (2013.01); *C08G 73/1039* (2013.01); *C08G 73/1078* (2013.01); *C08G 73/1096* (2013.01); *C08G 73/18* (2013.01); *G02F 1/133723* (2013.01); *B32B 2457/202* (2013.01); *G02F 2202/023* (2013.01); *Y10T 428/10* (2015.01); *Y10T 428/1005* (2015.01); *Y10T 428/1023* (2015.01)

(58) Field of Classification Search
CPC .. C08G 73/08; C08G 73/105; C08G 73/1078; C08G 73/1096; C08G 73/18; Y10T 428/10; Y10T 428/1005; Y10T 428/1018; Y10T 428/1023
USPC ........ 428/1.1, 1.2, 1.25, 1.26; 349/123, 130; 528/341
See application file for complete search history.

(56) References Cited

FOREIGN PATENT DOCUMENTS

JP 2008-077050 A 4/2008
WO 2008/117615 A1 10/2008

* cited by examiner

ALIGNMENT FILM AND LIQUID CRYSTAL DISPLAY DEVICE

TECHNICAL FIELD

The present invention relates to alignment films and liquid crystal display devices. The present invention specifically relates to an alignment film intended to be used for controlling the alignment of liquid crystal molecules and a liquid crystal display device including the alignment film.

BACKGROUND ART

Liquid crystal display devices are display devices utilizing a liquid crystal composition for display. A typical display mode thereof is applying voltage to a liquid crystal composition sealed between paired substrates to change the alignment state of liquid crystal molecules in the liquid crystal composition according to the applied voltage, thereby controlling the amount of light transmission. These liquid crystal display devices, having characteristics such as thin profile, light weight, and low power consumption, have been used in a broad range of fields.

When voltage is not applied, the alignment of liquid crystal molecules is generally controlled by an alignment film disposed on the surface of a substrate. Conventionally used materials (liquid crystal aligning agents) for alignment films are polyimide and polyamic acid, which is a precursor thereof, in many cases. Polyimide (polyamic acid) exhibits better physical properties such as heat resistance, affinity with liquid crystal, and mechanical strength than other organic resins. However, more reliable alignment films are demanded in association with, for example, improvement of the performance of liquid crystal panels, expansion of the range of use thereof, and diversification of the use environment thereof. Liquid crystal display devices including a polyimide-based (polyamic acid-based) alignment film may suffer generation of display defects such as image sticking and stain in some cases, and they are likely to occur especially due to storage in a high-temperature environment.

Considering this situation, in order to suppress reduction in display quality of liquid crystal display devices in a high-temperature environment, Patent Literature 1 discloses a polybenzoxazole-, polybenzothiazole-, or polybenzimidazole-based alignment film which has higher thermal stability than conventional polyimide-based (polyamic acid-based) alignment films. The literature also discloses that a thermally stable photo-alignment film is obtainable by introducing a photo-active group into the material of such a polybenzoxazole-, polybenzothiazole-, or polybenzimidazole-based alignment film. However, even the alignment film disclosed in Patent Literature 1 fails to have sufficient thermal stability. In the IPS mode and the FFS mode, this alignment film may cause impairment of the contrast and the long-term reliability. Such impairment is significant especially when a horizontal photo-alignment film and a negative liquid crystal material are combined.

CITATION LIST

Patent Literature

Patent Literature 1: JP 2008-77050 A

SUMMARY OF INVENTION

Technical Problem

As mentioned above, liquid crystal display devices including a conventional alignment film may suffer display defects such as image sticking and stain, and such defects are likely to occur especially due to storage in a high-temperature environment. According to studies performed by the inventors, one cause of such display defects is dissolution of a low-molecular-weight compound from the alignment film into the liquid crystal layer.

First, in some cases, part of an additive formed from a low-molecular-weight compound (hereinafter, also referred to as a low-molecular-weight additive) in the alignment film material may be contained in an unreacted state in the resulting alignment film, and this low-molecular-weight additive may dissolve into the liquid crystal layer. The low-molecular-weight additive dissolving into the liquid crystal layer are ionized by a reaction with a very slight amount of moisture present in the liquid crystal layer, causing image sticking and stain. Examples of such a low-molecular-weight additive include epoxy-based compounds, carboxylic acid-based compounds, and amine-based compounds. The low-molecular-weight additive is introduced so as to crosslink the polymer molecules constituting the alignment film. As the low-molecular-weight additive improves the cross-linking density, the hardness and compactness of the alignment film can be improved, so that the molecular weight of the polymer is increased. As a result, dissolution of the polymer into the liquid crystal layer can be suppressed. It should be noted that the low-molecular-weight additive does not entirely contribute to the crosslinking reaction. Thus, unreacted part of the low-molecular-weight additive unfortunately dissolves into the liquid crystal layer. Further, the low-molecular-weight additive is not uniformly distributed inside the alignment film but densely distributed in the vicinity of molecules having high affinity. This results in uneven resistance of the alignment film, causing display unevenness.

If no low-molecular-weight additive is introduced into the alignment film, relatively low molecular weight polymer components in the polymer constituting the alignment film dissolve into the liquid crystal layer. The polymer molecules dissolving into the liquid crystal layer are ionized by a reaction with a very slight amount of moisture present in the liquid crystal layer or a reaction induced by light or heat, causing image sticking and stain.

When a liquid crystal display device is placed in a high-temperature environment, the low-molecular-weight additive or the relatively low molecular weight polymer molecules in the alignment film is/are likely to dissolve into the liquid crystal layer. Thus, image sticking and stain easily occur.

Further, in the photo-alignment film, some of the photo-functional groups are decomposed by, for example, backlight illumination to dissolve into the liquid crystal layer by thermophoresis, in some cases. Also in this case, decomposed products of the photo-functional groups are ionized in the liquid crystal layer, causing generation of image sticking and stain.

The present invention is devised in view of the above state of the art, and aims to provide an alignment film having excellent heat resistance and capable of suppressing generation of defects such as image sticking and stain, and a liquid crystal display device including the alignment film.

Solution to Problem

The inventors found that one cause of display defects such as image sticking and stain is dissolution of a component having a relatively low molecular weight in the polymer constituting the alignment film into the liquid crystal layer, which causes reduction in reliability. The inventors have focused on the fact that conventional polymers for alignment films have a main chain with insufficient stiffness and thus can change in conformation, so that the low-molecular-weight component can easily dissolve into the liquid crystal layer. For example, polyimide includes an amic acid moiety having high flexibility. Polysiloxane and polyvinyl also have flexible structures. Thus, the inventors examined prevention of dissolution of a polymer into the liquid crystal layer by increasing the stiffness of the polymer to eliminate conformational change. As a result, the inventors found that a copolymer containing a monomer unit obtainable by cyclo-condensation of tetraamine and a dicarboxylic acid is an optimum alignment film material. Then, the inventors have arrived at the finding that an alignment film formed from this novel alignment film material can solve the above problems, completing the present invention.

In other words, one aspect of the present invention may be an alignment film containing a copolymer containing a repeating structural unit represented by the following formula (1):

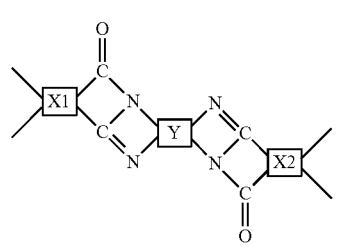
(1)

wherein X1 and X2 may be the same as or different from each other, and are each a structure represented by the following formula (X-1), (X-2), (X-3), (X-4), (X-5), (X-6), (X-7), (X-8), (X-9), (X-P1), (X-P2), (X-P3), or (X-P4), where a hydrogen atom may be replaced; and Y is a structure represented by the following formula (Y-1), (Y-2), (Y-3), (Y-4), (Y-5), (Y-6), (Y-7), (Y-8), (Y-9), (Y-10), (Y-11), (Y-12), (Y-P1), (Y-P2), (Y-P3), or (Y-P4), where a hydrogen atom may be replaced.

[X]

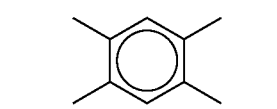
(X-1)

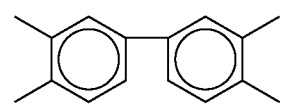
(X-2)

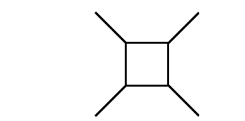
(X-3)

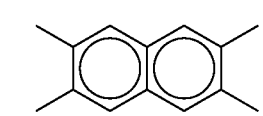
(X-4)

-continued

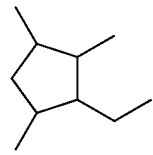
(X-5)

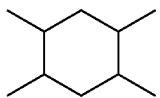
(X-6)

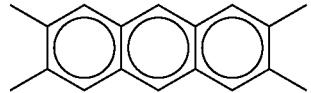
(X-7)

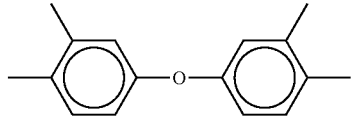
(X-8)

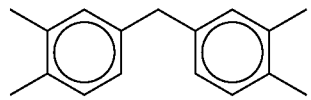
(X-9)

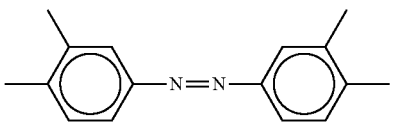
(X-P1)

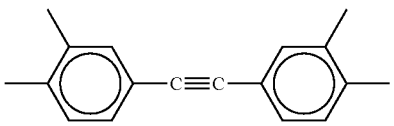
(X-P2)

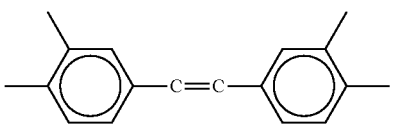
(X-P3)

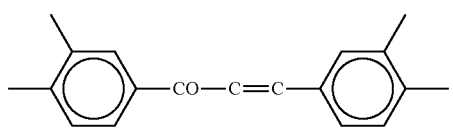
(X-P4)

[Y]

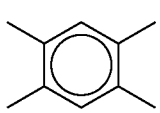
(Y-1)

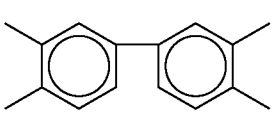
(Y-2)

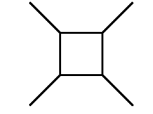
(Y-3)

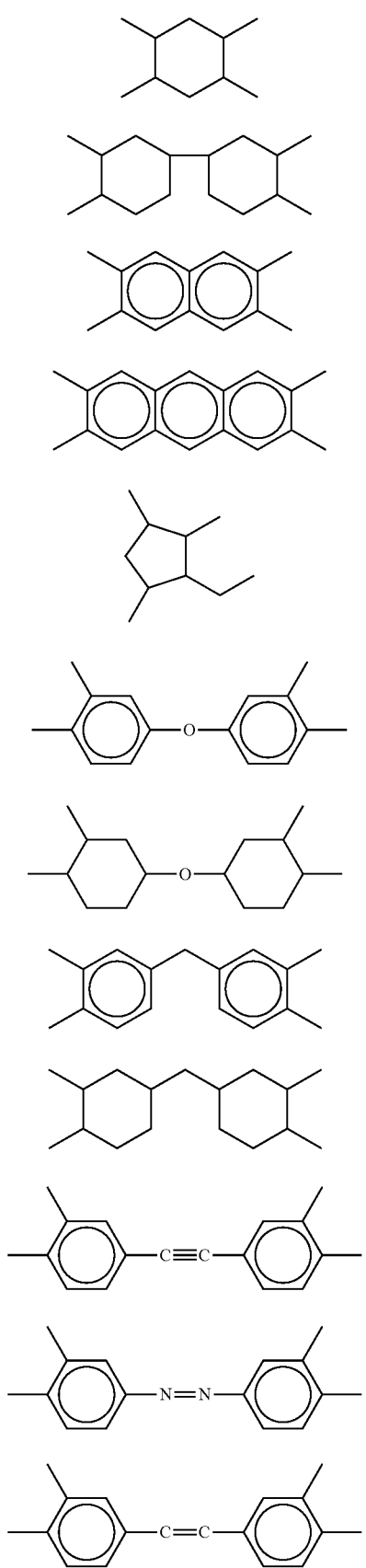

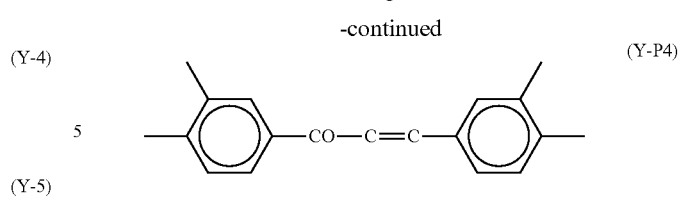

Another aspect of the present invention may be a liquid crystal display device including a pair of substrates and a liquid crystal layer disposed between the substrates, at least one of the substrates including an alignment film on a surface on the liquid crystal layer side, the alignment film optionally being the alignment film containing a copolymer containing a repeating structural unit represented by the formula (1).

Advantageous Effects of Invention

Since the alignment film of the present invention contains a copolymer containing a repeating structural unit represented by the formula (1), it has excellent heat resistance and is capable of preventing dissolution of impurities in the alignment film into the liquid crystal layer even in a high-temperature environment. Further, since the liquid crystal display device of the present invention includes the aforementioned alignment film, it can suppress generation of display defects such as image sticking and stain, and can achieve high display quality.

DESCRIPTION OF EMBODIMENTS

Figure 1:
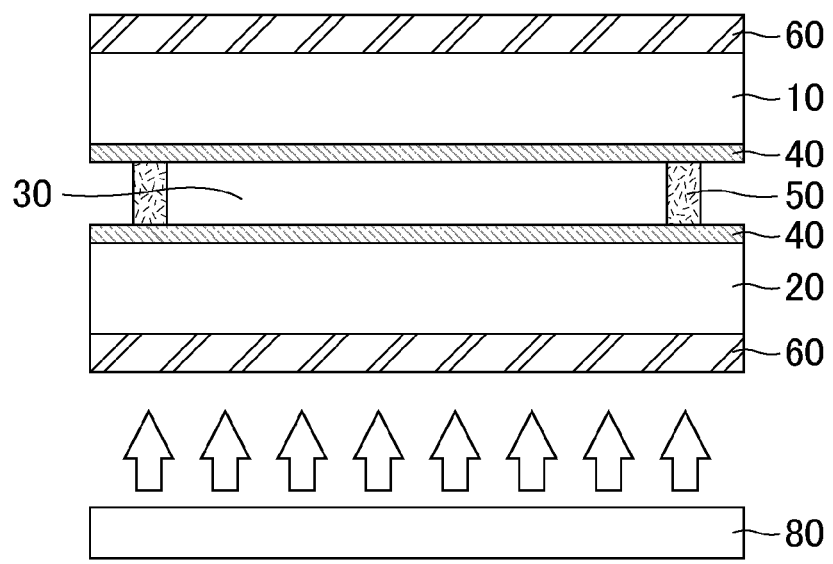
FIG. 1 is a schematic cross-sectional view of a liquid crystal display device of an embodiment.

The following will describe one embodiment of the present invention. The present invention is not limited to the contents of the following embodiment and the design thereof can be modified as appropriate within the scope satisfying the configuration of the present invention.
(Alignment Film)
The present embodiment relates to an alignment film containing a copolymer containing a repeating structural unit represented by the following formula (1):

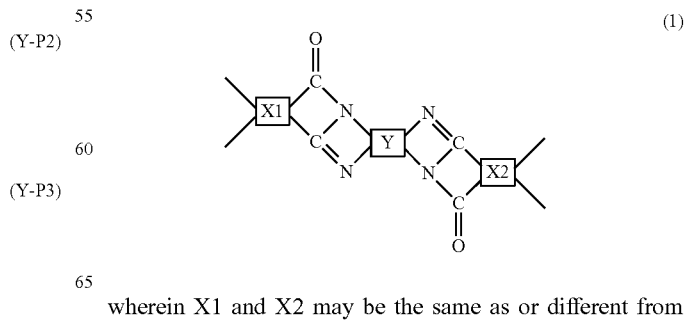

wherein X1 and X2 may be the same as or different from each other and are each a structure represented by the following formula (X-1), (X-2), (X-3), (X-4), (X-5), (X-6), (X-7), (X-8), (X-9), (X-P1), (X-P2), (X-P3), or (X-P4), where a hydrogen atom may be replaced; and Y is a structure represented by the following formula (Y-1), (Y-2), (Y-3), (Y-4), (Y-5), (Y-6), (Y-7), (Y-8), (Y-9), (Y-10), (Y-11), (Y-12), (Y-P1), (Y-P2), (Y-P3), or (Y-P4), where a hydrogen atom may be replaced.
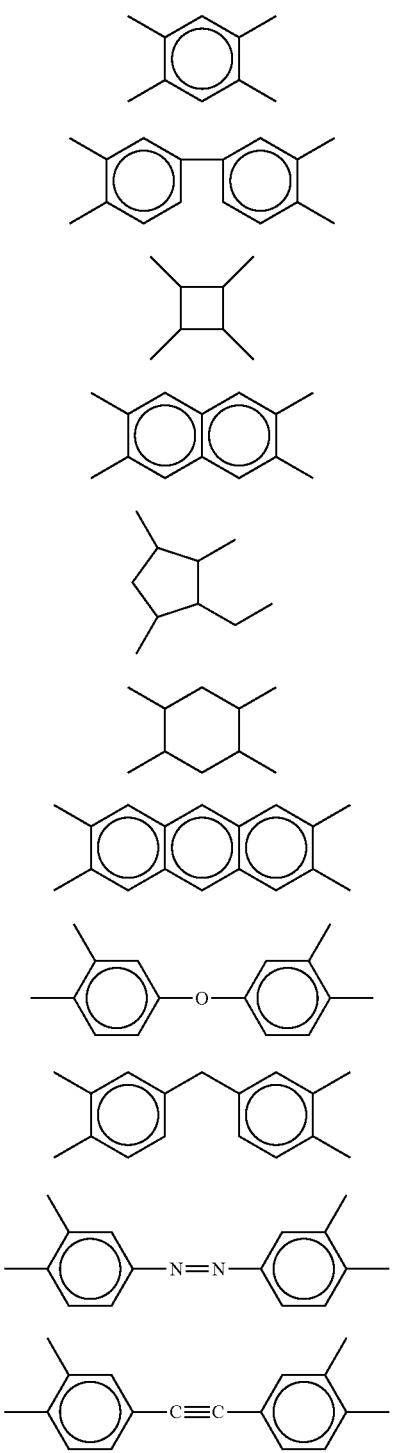
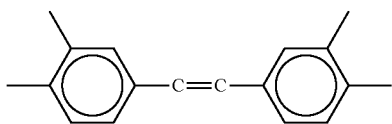
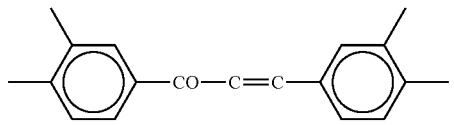
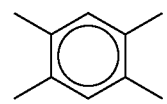
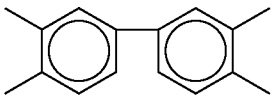
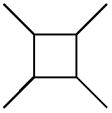
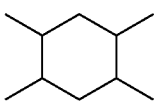
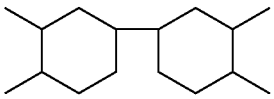
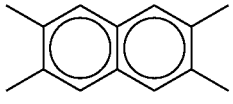
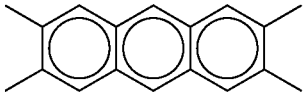
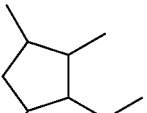
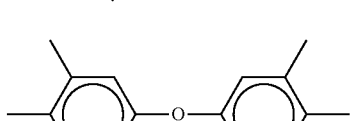
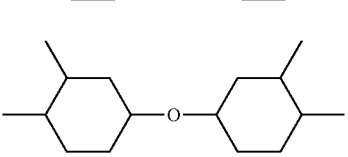

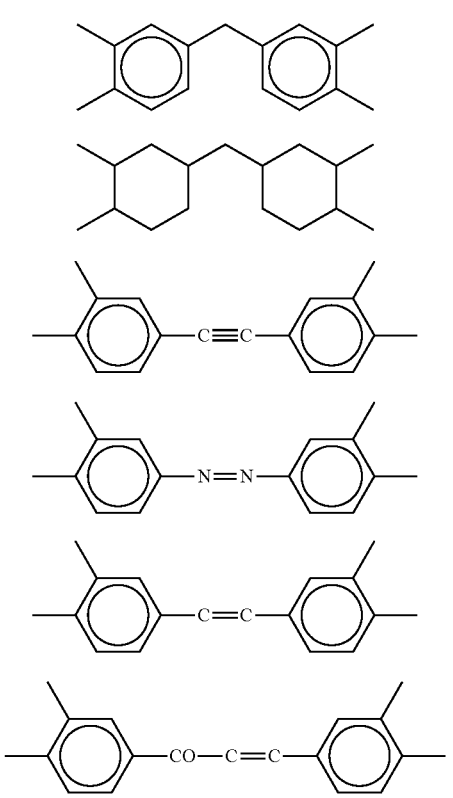

The repeating structural unit represented by the formula (1) has a ladder-like molecular structure, which improves the stiffness of the molecule. Thus, the copolymer is less likely to change in conformation, suppressing the translational and rotational motions thereof. This prevents a low-molecular-weight component in the alignment film from dissolving into the liquid crystal. As a result, generation of defects such as image sticking and stain can be suppressed.

Dissolution of the low-molecular-weight component in the alignment film into the liquid crystal is promoted by temperature rise. Thus, when the liquid crystal display device is stored at high temperature, it is markedly observed that the above copolymer can suppress the dissolution of the low-molecular-weight component into the liquid crystal. Thus, it can be said that use of the copolymer improves the heat resistance (thermal stability) of the alignment film.

The repeating structural unit represented by the formula (1) has a higher flatness (is flatter) than the imide ring of polyimide constituting a polyimide-based alignment film, and thus can increase the degree of alignment of the liquid crystal molecules, thereby increasing the degree of alignment of the alignment film. This results in an effect of improving the contrast especially in the IPS mode and the FFS mode. Further, improvement in the degree of alignment of the liquid crystal molecules can suppress disturbance of the alignment due to heat fluctuation of the alignment film, and thus can prevent reduction in contrast over time.

If the repeating structural unit represented by the formula (1) is stiff, it can improve the hardness of the alignment film. This can prevent peeling of the alignment film due to contact with a columnar spacer or any other structure. As a result, disturbance of the alignment can be prevented and reduction in contrast can be prevented.

Since the copolymer contains the repeating structural unit represented by the formula (1), it requires no low-molecular-weight additive. This can prevent uneven distribution of the low-molecular-weight additive and provide uniform resistance of the alignment film on the entire film in terms of a plane. Thus, generation of display unevenness can be prevented and the contrast can be heightened.

The copolymer can exhibit significant effects in a photo-alignable alignment film used for a horizontal alignment mode, especially the IPS mode or the FFS mode. Further, the copolymer can effectively suppress reduction in long-term reliability with the use of a negative liquid crystal material.

In formation of polyimide, polyamic acid is first formed by a thermal reaction between a diamine and an acid anhydride, and then an imide ring is formed by continuous heating. Thus, polyimide contains amic acid before imidization. In contrast, the repeating structural unit represented by the formula (1) is formed by a one-step thermal reaction between a tetraamine and an acid anhydride, and thus it always has a ring-closure structure as indicated by the formula (1) during the use. Thus, the alignment film formed from the copolymer is a film having a high degree of alignment, high hardness, and uniform resistance on the entire film surface.

The repeating structural unit represented by the formula (1) may or may not contain a photo-alignable moiety. If the repeating structural unit represented by the formula (1) does not contain a photo-alignable moiety, X1 and X2 may be the same as or different from each other, and may be a structure represented by the above formula (X-1), (X-2), (X-3), (X-4), (X-5), (X-6), (X-7), (X-8), or (X-9); and Y is a structure represented by the above formula (Y-1), (Y-2), (Y-3), (Y-4), (Y-5), (Y-6), (Y-7), (Y-8), (Y-9), (Y-10), (Y-11), or (Y-12). If the repeating structural unit represented by the formula (1) contains a photo-alignable moiety, at least one of X1, X2, and Y is a photo-reactive structure and the photo-reactive structure is a structure represented by any of the above formulas (X-P1), (X-P2), (X-P3), (X-P4), (Y-P1), (Y-P2), (Y-P3), and (Y-P4).

If the alignment film contains the above photo-alignable moiety, alignment treatment can be achieved by light irradiation. The photo-alignment treatment is a highly reliable, dust-free method of aligning liquid crystal with excellent in-plane uniformity. Since the alignment treatment is directly applied to the alignment film, no alignment control means such as protrusions and structures, which serve as factors reducing the transmittance, are required. Thus, a high transmittance can be achieved. The light may be ultraviolet rays, visible light, or combination thereof. The light may be polarized light or may be non-polarized light.

The photo-alignable moiety may possibly be decomposed by light applied during the photo-alignment treatment or backlight illumination. Still, since the copolymer contains a stiff structure represented by the formula (1), the molecular motion is less likely to occur in the film and, even if low-molecular-weight impurities are generated by photolysis, movement of such impurities is extremely suppressed. Thus, dissolution of the impurities into the liquid crystal can be prevented.

Each molecule of the copolymer may contain one or two or more X1s, one or two or more X2s, and one or two or more Ys. For example, each molecule of the copolymer may contain both the structure represented by the above formula (X-1) and the structure represented by the above formula (X-2).

The alignment film may contain one copolymer containing a repeating structural unit represented by the formula (1), or may contain two or more copolymers containing a repeating structural unit represented by the formula (1).

The copolymer preferably has a weight average molecular weight of 5000 or higher and 500000 or lower. The copolymer having a weight average molecular weight within a range of 5000 to 500000 can sufficiently exhibit an effect of suppressing dissolution of a low-molecular-weight component while ensuring the solubility in a solvent. The weight average molecular weight can be determined by gel permeation chromatography (GPC).

The copolymer may or may not contain a structural unit different from the repeating structural unit represented by the formula (1). The different structural unit may be any unit. In order to improve the film formability in any application method such as an ink-jet method and a printing method, the different structural unit may be suitably a monomer unit derived from imide (amic acid) having solvent solubility. In other words, the copolymer may contain a repeating structural unit represented by the following formula (2):

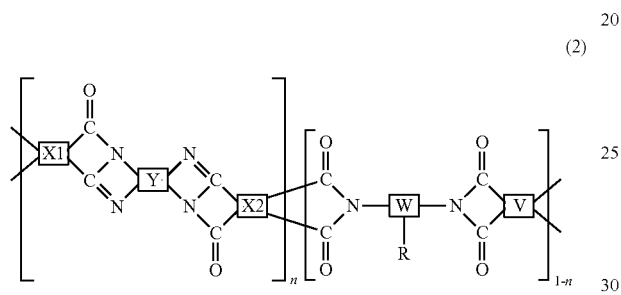

(2)

wherein n represents the proportion of the structural units represented by the formula (1) in the structural units represented by the above formula (2), and is a real number greater than 0 and smaller than 1; V is a structure represented by the following formula (V-1), (V-2), (V-3), (V-4), (V-5), (V-6), (V-7), (V-8), (V-9), (V-P1), (V-P2), (V-P3), or (V-P4), where a hydrogen atom may be replaced; W is a structure represented by the following formula (W-1), (W-2), (W-3), (W-4), (W-5), (W-6), (W-7), (W-8), (W-9), (W-10), (W-11), (W-12), (W-13), (W-14), (W-15), (W-16), (W-P1), (W-P2), (W-P3), (W-P4), (W-P5), (W-P6), (W-P7), or (W-P8), where a hydrogen atom may be replaced; and R is a horizontal alignment group or a vertical alignment group.

[V]

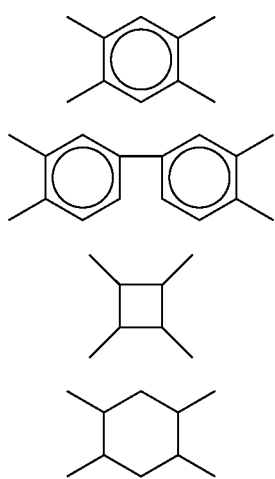

(V-1)

(V-2)

(V-3)

(V-4)

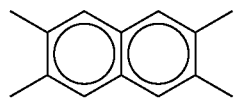

(V-5)

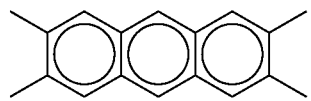

(V-6)

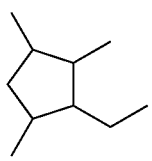

(V-7)

(V-8)

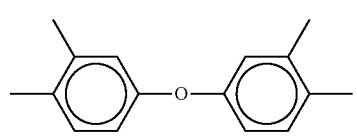

(V-9)

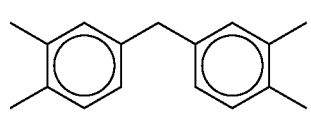

(V-P1)

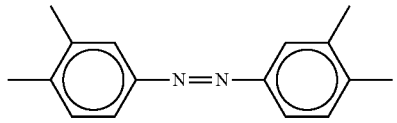

(V-P2)

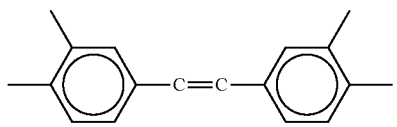

(V-P3)

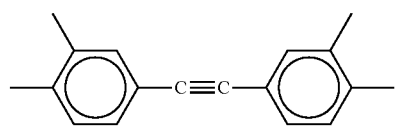

(V-P4)

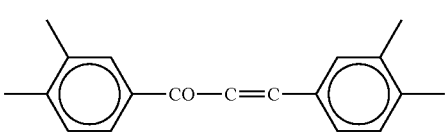

[W]

(W-1)

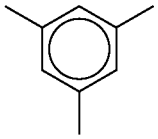

(W-2)

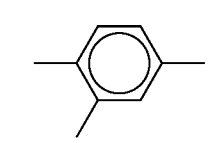

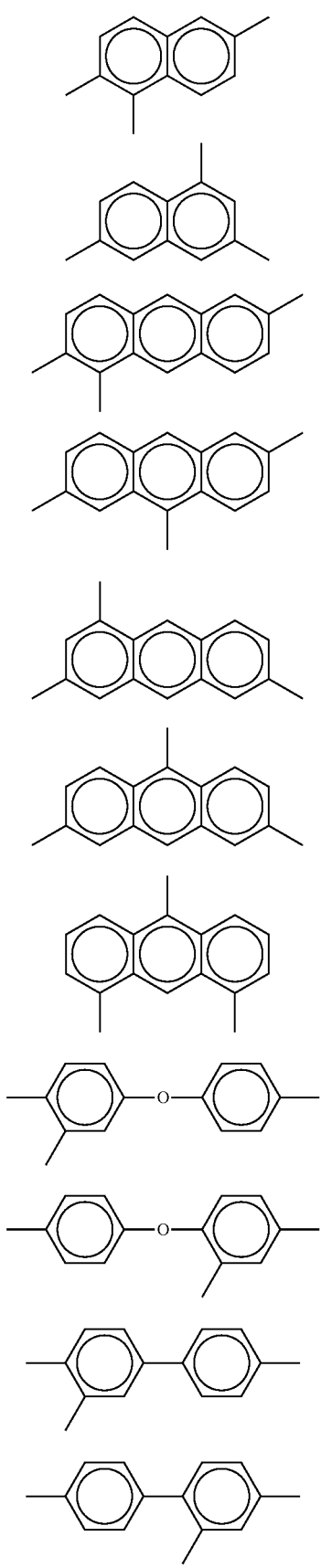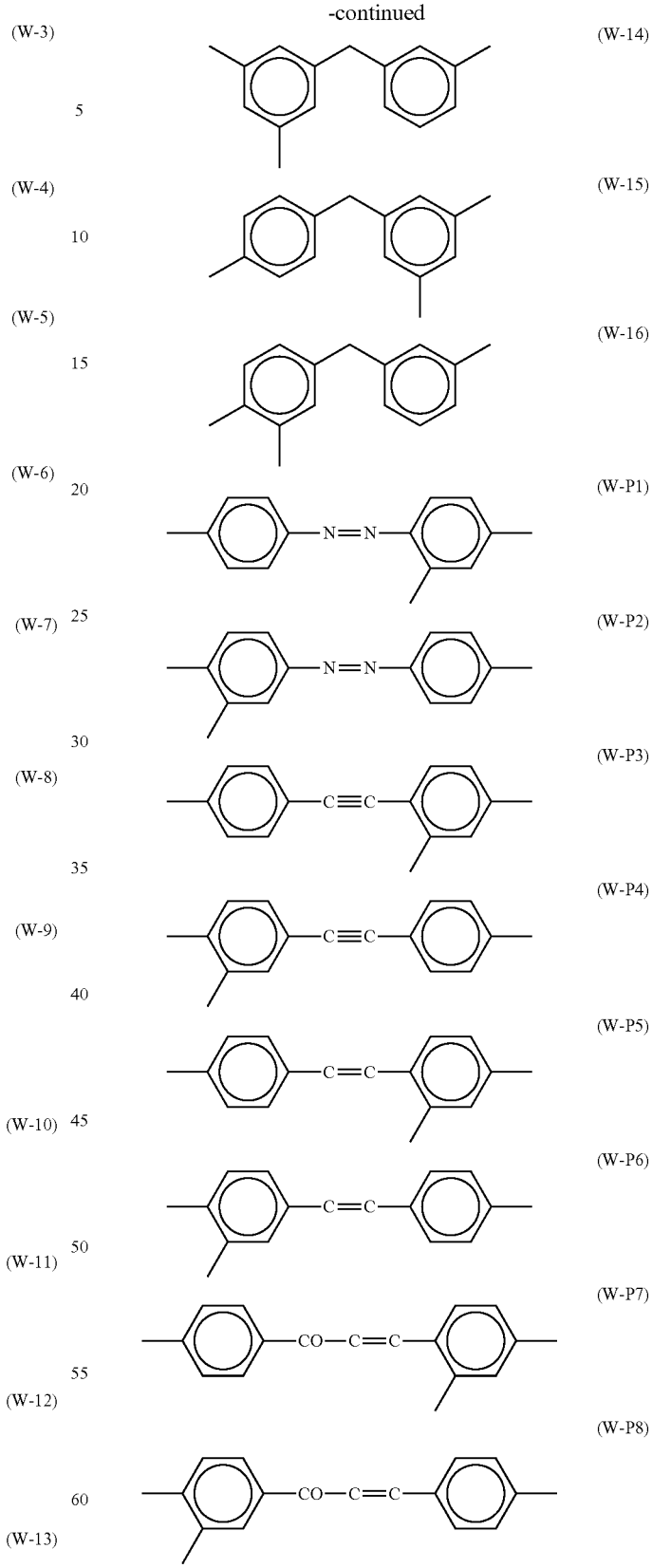
The repeating structural unit represented by the above formula (2) may or may not contain a photo-alignable moiety. If the repeating structural unit represented by the above formula (2) does not contain a photo-alignable moiety, X1 and X2 may be the same as or different from each other, and are each a structure represented by the above formula (X-1), (X-2), (X-3), (X-4), (X-5), (X-6), (X-7), (X-8), or (X-9); Y is a structure represented by the above formula (Y-1), (Y-2), (Y-3), (Y-4), (Y-5), (Y-6), (Y-7), (Y-8), (Y-9), (Y-10), (Y-11), or (Y-12); V is a structure represented by the above formula (V-1), (V-2), (V-3), (V-4), (V-5), (V-6), (V-7), (V-8), or (V-9); and W is a structure represented by the above formula (W-1), (W-2), (W-3), (W-4), (W-5), (W-6), (W-7), (W-8), (W-9), (W-10), (W-11), (W-12), (W-13), (W-14), (W-15), or (W-16). If the repeating structural unit represented by the above formula (2) contains a photo-alignable moiety, at least one of X1, X2, Y, V, and W is a photo-reactive structure, and the photo-reactive structure is a structure represented by any of the above formulas (X-P1), (X-P2), (X-P3), (X-P4), (Y-P1), (Y-P2), (Y-P3), (Y-P4), (V-P1), (V-P2), (V-P3), (V-P4), (W-P1), (W-P2), (W-P3), (W-P4), (W-P5), (W-P6), (W-P7), and (W-P8).

R is a horizontal alignment group or a vertical alignment group. If R is a horizontal alignment group, R may be a structure represented by the following formula (R-H1), (R-H2), (R-H3), (R-H4), (R-H5), (R-H6), (R-H7), or (R-H8). If R is a vertical alignment group, R may be a structure represented by the following formula (R-V1), (R-V2), (R-V3), (R-V4), (R-V5), (R-V6), or (R-V7). In the following formula (R-H7), the methyl group may bond to any carbon atom in the benzene ring. In the following formula (R-H8), the methyl group may bond to any carbon atom in the cyclohexane ring. In the following formula (R-V6), the trifluoromethyl group may bond to any carbon atom in the benzene ring. In the following formula (R-V7), the fluorine atom may bond to any carbon atom in the benzene ring.

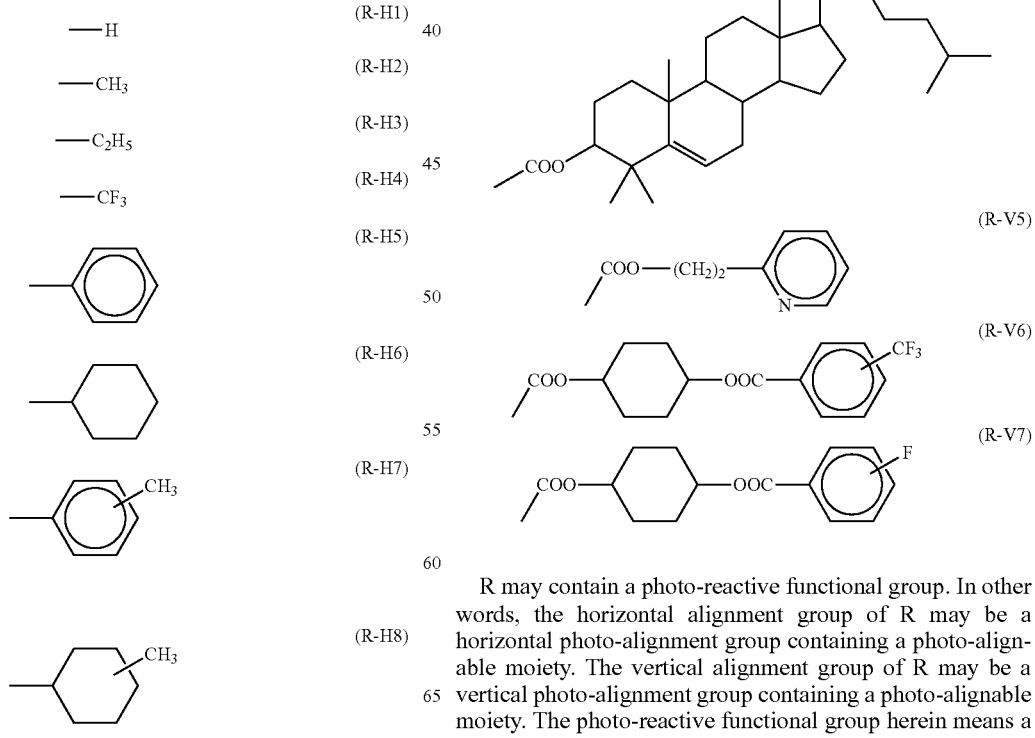

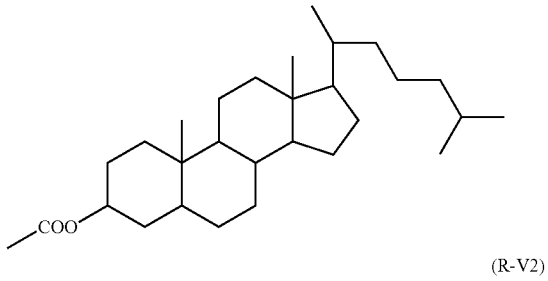
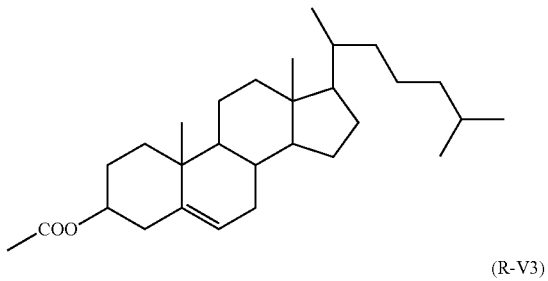
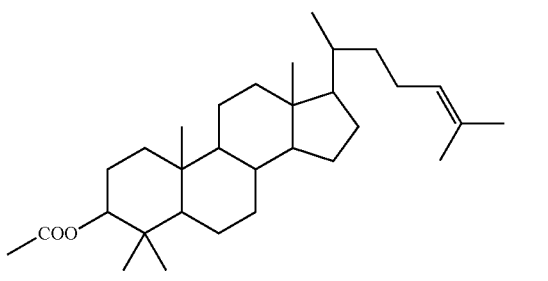
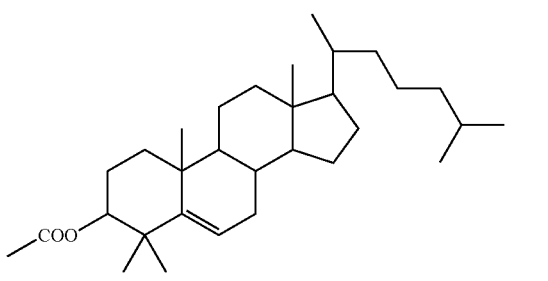
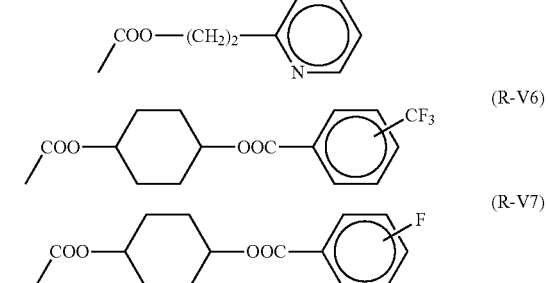

R may contain a photo-reactive functional group. In other words, the horizontal alignment group of R may be a horizontal photo-alignment group containing a photo-alignable moiety. The vertical alignment group of R may be a vertical photo-alignment group containing a photo-alignable moiety. The photo-reactive functional group herein means a functional group the structure of which is changed by application of light (electromagnetic waves), such as ultraviolet rays or visible light, and which thus exhibits an ability (alignment anchoring force) to control the alignment of liquid crystal molecules present in the vicinity of the group or which varies the level and/or direction of the alignment anchoring force.

Examples of the photo-reactive functional group include those containing a photo-reactive moiety where a reaction such as dimerization (formation of dimer), isomerization, photo-Fries rearrangement, or decomposition is caused by light irradiation. Preferred is a cinnamate group, a chalcone group, an azobenzene group, a coumarin group, a tolane group, or a stilbene group, for example. These photo-reactive functional groups may possibly be decomposed by light applied during photo-alignment treatment or backlight illumination during the use of a liquid crystal display device. Still, the copolymer contains a stiff structure represented by the formula (1). Thus, even if low-molecular-weight impurities are generated by photolysis, movement of such impurities in the film is extremely suppressed, preventing dissolution of the impurities into the liquid crystal layer.

If R is a horizontal alignment group, the photo-reactive functional group is preferably a structure represented by the following formula (R-HP1) or (R-HP2). In the following formula (R-HP2), the methyl group may bond to any carbon atom in the benzene ring.

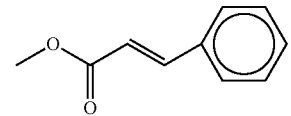

(R-HP1)

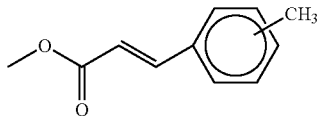

(R-HP2)

If R is a vertical alignment group, the photo-reactive functional group is preferably a structure represented by the following formula (R-VP1), (R-VP2), (R-VP3), (R-VP4), (R-VP5), (R-VP6), (R-VP7), (R-VP8), (R-VP9), (R-VP10), (R-VP11), (R-VP12), (R-VP13), (R-VP14), (R-VP15), (R-VP16), (R-VP17), (R-VP18), (R-VP19), (R-VP20), or (R-VP21):

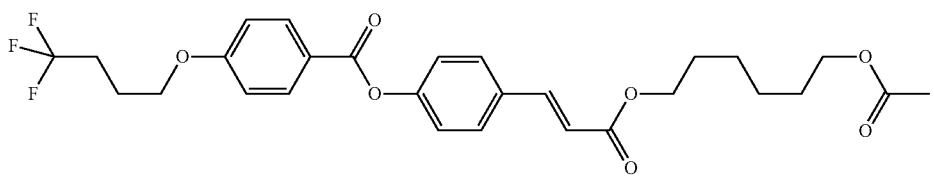

(R-VP1)

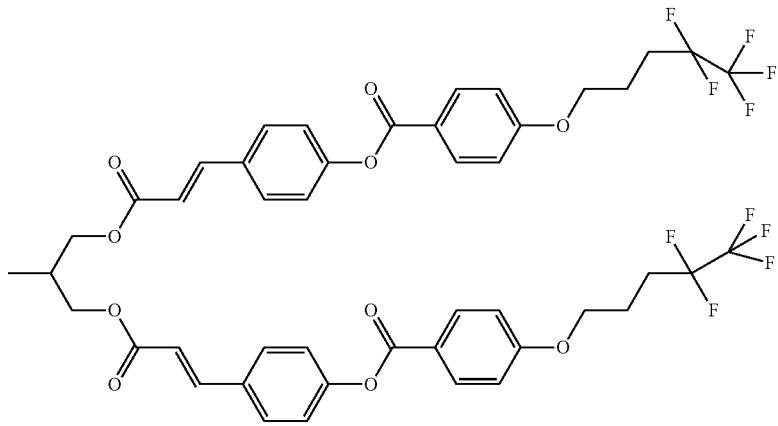

(R-VP2)

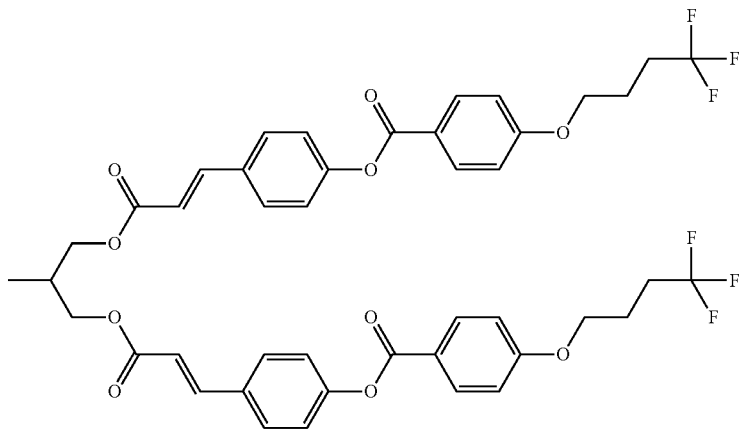

(R-VP3)

-continued
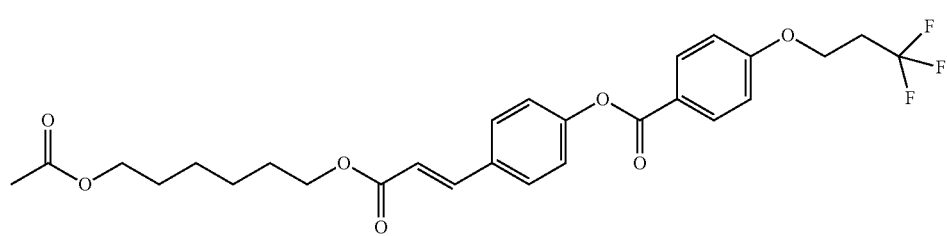
(R-VP4)
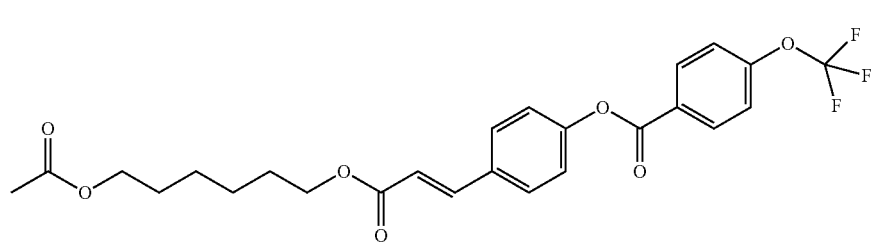
(R-VP5)
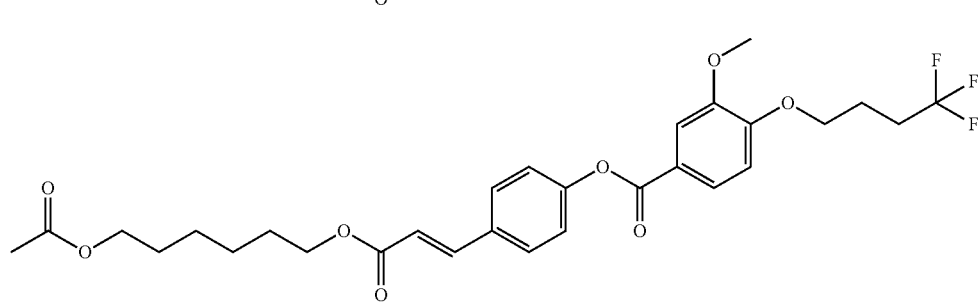
(R-VP6)
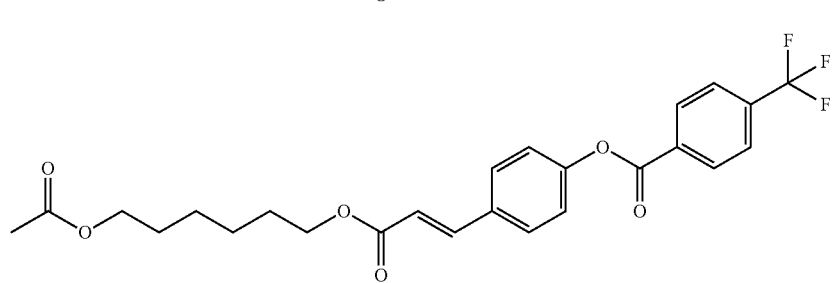
(R-VP7)
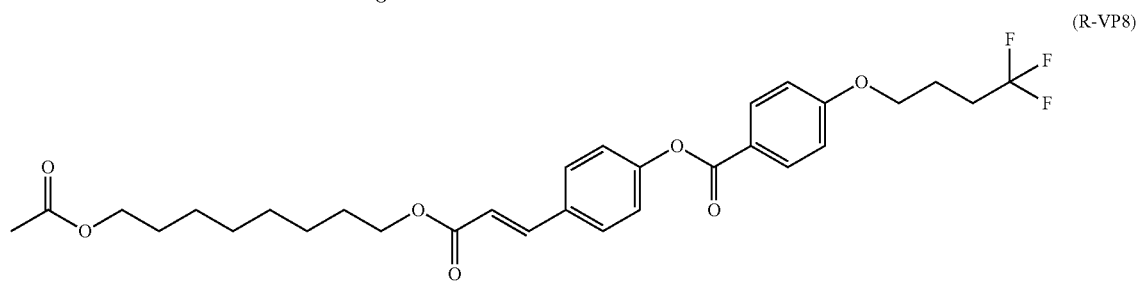
(R-VP8)
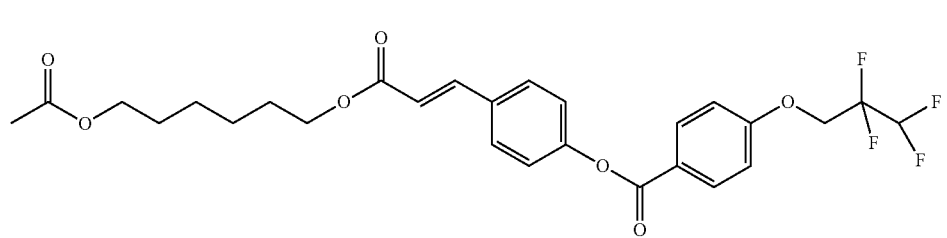
(R-VP9)
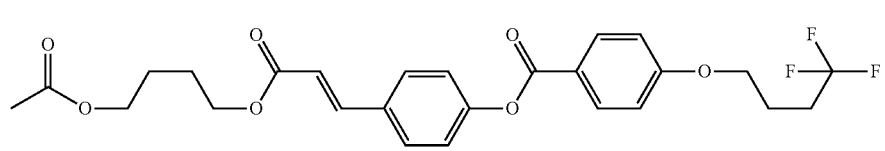
(R-VP10)

-continued
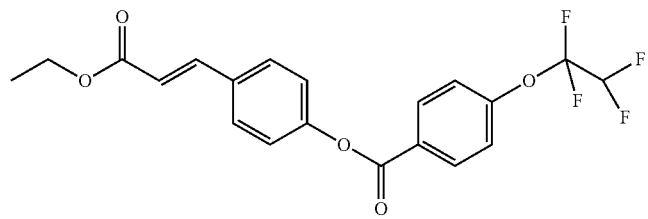
(R-VP11)
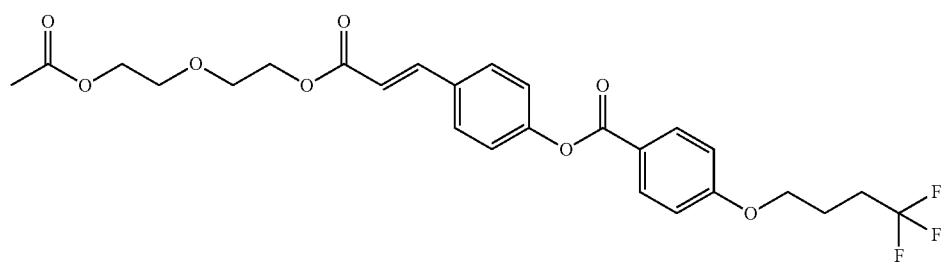
(R-VP12)
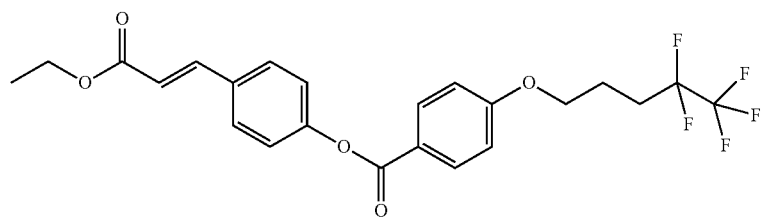
(R-VP13)
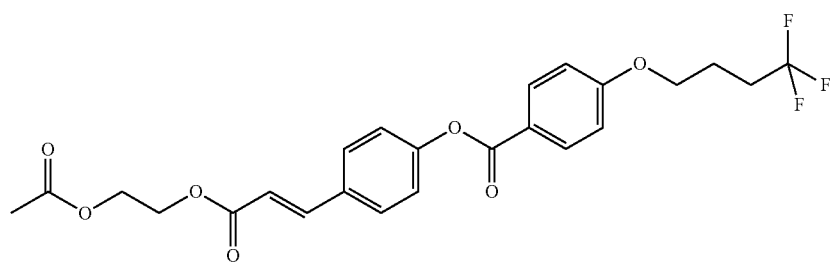
(R-VP14)
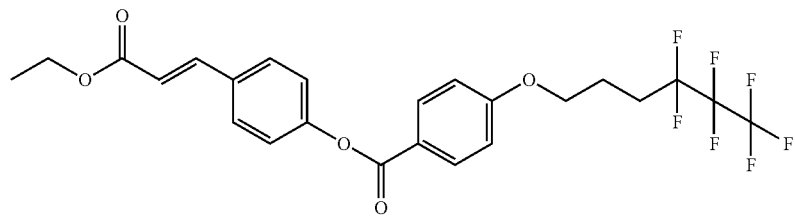
(R-VP15)
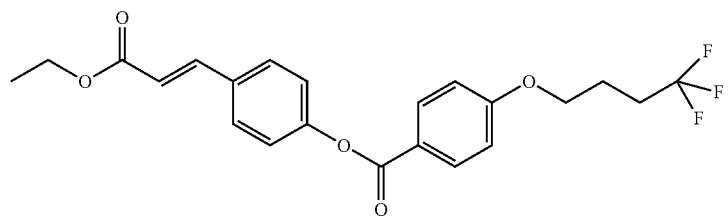
(R-VP16)

-continued

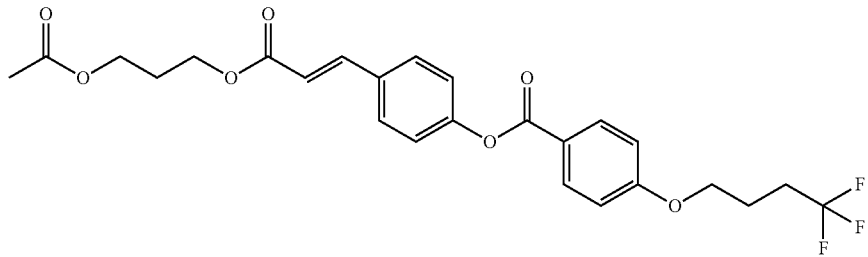
(R-VP17)

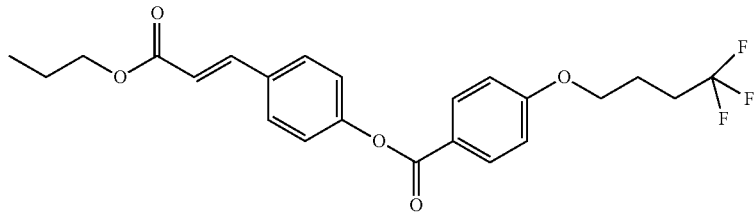
(R-VP18)

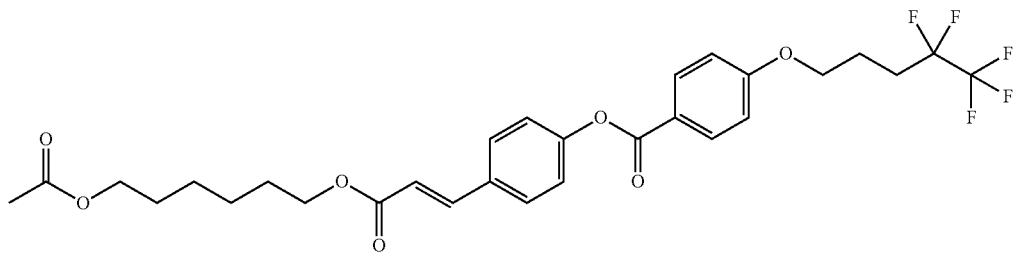
(R-VP19)

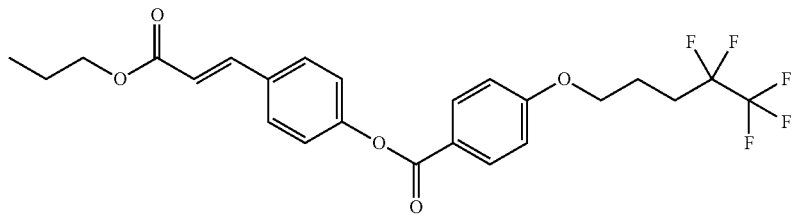
(R-VP20)

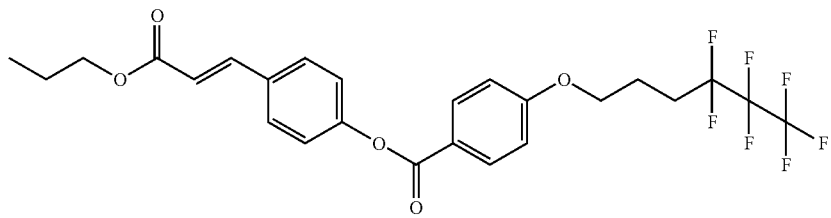
(R-VP21)

wherein n represents the proportion of the structural units represented by the formula (1) in the structural units represented by the above formula (2), and is preferably greater than 0 and not greater than 0.80. When n is within the above range, the effect of improving the film formability can be sufficiently achieved while the effect of suppressing dissolution of a low-molecular-weight component owing to the structural unit represented by the formula (1) can be secured. In view of these effects, n is more preferably within a range of 0.01 to 0.50, still more preferably within a range of 0.03 to 0.20.

In the repeating structural unit represented by the above formula (2), the structural unit represented by the formula (1) (the structural unit on the left side) and the different structural unit (structural unit on the right side) may be arranged in any form. For example, they may be alternately arranged as "ABABAB", or may be randomly arranged as "AABABB", or may be arranged as "AAABBB" in the form of blocks in the copolymer, where "A" represents the structural unit represented by the formula (1) and "B" represents the different structural unit.

Each molecule of the copolymer may contain one or two or more X1s, one or two or more X2s, one or two or more Ys, one or two or more Vs, one or two or more Ws, and one or two or more Rs. For example, each molecule of the copolymer may contain both the structure represented by the above formula (W-1) and the structure represented by the above formula (W-2).

The alignment film has only to contain at least one copolymer containing a repeating structural unit represented by the formula (2). It may contain only one copolymer or may contain two or more copolymers.

The alignment film may further contain other components in addition to the copolymer. Examples of such other components include those derived from components in the liquid crystal aligning agent to be mentioned later.

The alignment film may be formed by applying a liquid crystal aligning agent which serves as a material of the alignment film to a substrate, then heating the agent to form a film, and performing alignment treatment on the film.

The liquid crystal aligning agent usually contains a monomer to constitute the copolymer and an organic solvent. It may contain other components if necessary, and is preferably prepared as a composition in the form of solution in which the respective components are dissolved in a solvent. The organic solvent is preferably one which dissolves the monomer and the other components and does not react therewith. Examples of the other components include polymers other than the above copolymer; and additives such as a curing agent, a curing accelerator, and a catalyst. The polymers other than the above copolymer may be used for further improving the solution properties of the liquid crystal aligning agent and the electric properties of the alignment film. Since the repeating structural unit represented by the formula (1) can be formed by a one-step thermal reaction between a tetraamine and an acid anhydride, the additives are preferably not blended, although they may be blended if necessary.

The application may be achieved by any method, and examples thereof include roll coating, spin coating, printing, and an ink-jet method. The heating may be divided into two stages, i.e., pre-heating (pre-baking) and baking (post-baking).

The alignment treatment may be achieved by any method, and may be rubbing treatment or photo-alignment treatment. In the rubbing treatment, the surface of the alignment film is rubbed with a cloth wrapped around a roller so that a desired alignment anchoring force is imparted to the alignment film. In the photo-alignment treatment, the alignment film is irradiated with (exposed to) light such as ultraviolet rays or visible light, so that a desired alignment anchoring force is imparted to the alignment film. The light used in the photo-alignment treatment may be, for example, linearly polarized light, elliptically polarized light, circularly polarized light, or non-polarized light.

The alignment film preferably has a thickness of 10 nm or greater, more preferably 40 nm or greater, still more preferably 45 nm or greater, particularly preferably 50 nm or greater, while preferably 300 nm or smaller, more preferably 150 nm or smaller, still more preferably 145 nm or smaller, particularly preferably 140 nm or smaller.

(Liquid Crystal Display Device)

The alignment film is used in a liquid crystal display device so as to control the alignment of liquid crystal molecules in the liquid crystal layer. The liquid crystal display device may be of any type. The following will describe one example of a liquid crystal display device including the alignment film referring to FIG. 1 and FIG. 2.

Figure 2:
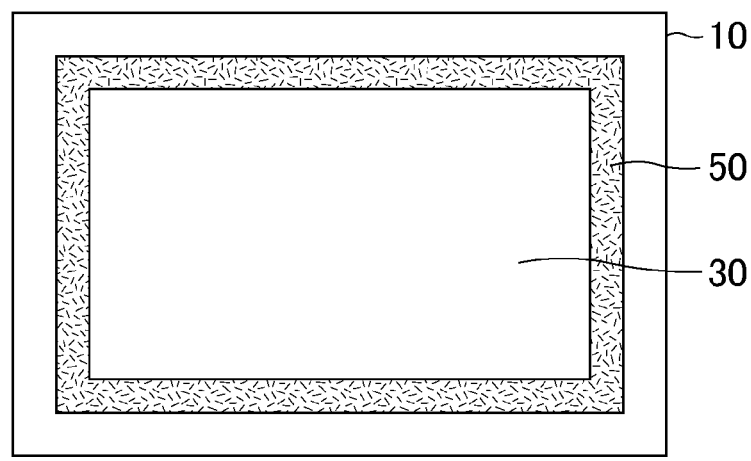
FIG. 2 is a schematic plan view of a liquid crystal display panel of the embodiment.

FIG. 1 is a schematic cross-sectional view of a liquid crystal display device of the embodiment. FIG. 2 is a schematic plan view of a liquid crystal display panel of the embodiment. As illustrated in FIG. 1 and FIG. 2, the liquid crystal display device of the present embodiment includes a pair of substrates 10 and 20 and a liquid crystal layer 30 disposed between the substrates 10 and 20, at least one of the substrates 10 and 20 including an alignment film 40 on the surface on the liquid crystal layer 30 side. The alignment film 40 contains a copolymer containing the repeating structural unit represented by the formula (1).

The pair of substrates 10 and 20 may be a combination of an active matrix substrate (TFT substrate) and a color filter (CF) substrate, for example. The active matrix substrate may be one usually used in the field of liquid crystal display devices. The active matrix substrate may have a planar structure including, on a transparent substrate, multiple parallel gate signal lines; multiple parallel source signal lines extending in the direction perpendicular to the gate signal lines; active elements such as thin film transistors (TFTs) disposed at the respective intersections of the gate signal lines and the source signal lines; and pixel electrodes disposed in the respective regions defined by the gate signal lines and the source signal lines in a matrix pattern. In the case of a horizontal alignment mode, the structure further includes other components such as common conductive lines and counter electrodes connected to the common conductive lines.

The TFTs are preferably those having a channel formed from amorphous silicon, polysilicon, or indium-gallium-zinc-oxygen (IGZO) which is an oxide semiconductor. An oxide semiconductor is particularly advantageous to low frequency driving of a liquid crystal display device because it causes a small off-leakage current. Still, if the liquid crystal layer 30 has a low VHR, the display device cannot be driven at a low frequency. On the contrary, the present invention can increase the VHR of the liquid crystal layer 30, and thus the display device can be driven at a low frequency. In other words, it is particularly favorable to combine an oxide semiconductor with the present invention.

In the active matrix display mode, generally, a signal voltage is applied to an electrode through a TFT disposed to a pixel when the TFT is in the ON state, and the electric charge applied to the pixel at this time is held during the period in which the TFT is in the OFF state. The proportion of the electric charges held during 1 frame period (e.g., 16.7 ms) to the electric charges applied is the voltage holding ratio (VHR). In other words, the lower the VHR is, the more easily the voltage applied to the liquid crystal layer is attenuated over time. Thus, the active matrix display mode requires a high VHR.

The color filter substrate may be one usually used in the field of liquid crystal display devices. The color filter substrate may have a structure including, on a transparent substrate, components such as a black matrix in a grid pattern and color filters disposed in the respective grids, i.e., pixels.

Either of the substrates 10 and 20 may include both the color filter and the active matrix.

The liquid crystal layer 30 may be any layer containing liquid crystal molecules. The anisotropy of dielectric constant ($\Delta\varepsilon$) defined by the following formula (P) of the liquid crystal molecules may be negative or may be positive. In other words, the liquid crystal molecules may have negative anisotropy of dielectric constant or may have positive anisotropy of dielectric constant. The liquid crystal molecules having negative anisotropy of dielectric constant may have a $\Delta\varepsilon$ value of −1 to −20. The liquid crystal molecules having positive anisotropy of dielectric constant may have a $\Delta\varepsilon$ value of 1 to 20.

$$\Delta\varepsilon = \text{(dielectric constant in the major axis direction)} - \text{(dielectric constant in the minor axis direction)} \quad (P)$$

In conventional liquid crystal display devices, defects such as image sticking and stain tend to occur more significantly when liquid crystal molecules having negative dielectric anisotropy are used than when liquid crystal molecules having positive anisotropy of dielectric constant are used. This is presumably because the liquid crystal molecules having negative dielectric anisotropy show great polarization in the minor axis direction, and thus are more greatly affected by the reduction in VHR due to ionization. In other words, the alignment film of the present invention can exhibit higher effects in a system including a liquid crystal material having negative dielectric anisotropy.

An alignment film 40 is disposed between the liquid crystal layer 30 and each of the substrates 10 and 20. In FIG. 1, the alignment film 40 is disposed between the substrate 10 and the liquid crystal layer 30 and between the substrate 20 and the liquid crystal layer 30. Still, the alignment film 40 may be disposed on either of them. The alignment film 40 functions to control the alignment of the liquid crystal molecules in the liquid crystal layer 30. When the voltage applied to the liquid crystal layer 30 is lower than the threshold voltage (including the case when no voltage is applied), the alignment of the liquid crystal molecules in the liquid crystal layer 30 is mainly controlled by the function of the alignment film 40. The angle formed by the major axis of the liquid crystal molecules relative to the surfaces of the substrates 10 and 20 in this state is called the "pre-tilt angle". The "pre-tilt angle" herein means an angle of the inclination of the liquid crystal molecules from the direction parallel to the substrate surfaces. The angle parallel to the substrate surfaces is 0° and the angle corresponding to the normal of the substrate surfaces is 90°.

The pre-tilt angle of the liquid crystal molecules formed by the alignment film 40 may be any value, and the alignment film 40 may be a horizontal alignment film or may be a vertical alignment film. As will be mentioned later, when the alignment film 40 is a photo-alignable horizontal alignment film (horizontal photo-alignment film), the alignment film can particularly sufficiently exhibit the effects of the invention. In the case of a horizontal alignment film, the pre-tilt angle is preferably substantially 0° (for example, smaller than 10°). In order to achieve an effect of maintaining good contrast performance for a long period of time, the pre-tilt angle is more preferably 0°. If the display mode is the IPS mode or the FFS mode, the pre-tilt angle is preferably 0° also in view of the viewing angle characteristics. If the display mode is the TN mode, the pre-tilt angle is set to about 2°, for example, due to the mode-related limitation.

The substrates 10 and 20 are attached to each other by a sealing material 50. As illustrated in FIG. 2, the sealing material 50 is disposed so as to surround the liquid crystal layer 30. The sealing material 50 may be an epoxy resin containing an inorganic filler or an organic filler and a curing agent, for example.

The liquid crystal display device may be of any alignment mode, and examples of the display mode include horizontal alignment modes such as the fringe field switching (FFS) mode and the in-plane switching (IPS) mode); the vertical alignment (VA) mode; the reverse twisted nematic (RTN) mode; and the twisted nematic (TN) mode.

When the alignment mode is a horizontal alignment mode, the photo-alignment film is likely to generate radicals. Thus, the effects of the invention can be significantly achieved. In other words, in vertical alignment mode photo-alignment treatment (polarized UV irradiation), the pre-tilt angle has only to be slightly inclined from 90°. In contrast, in horizontal alignment mode photo-alignment treatment, the azimuth of the liquid crystal alignment (the direction in the plane of the substrate) needs to be controlled more precisely. Thus, the irradiation dose in horizontal alignment mode photo-alignment treatment is usually higher than in a vertical alignment mode by one or more digits, and more radicals are likely to be generated by a side reaction than in a vertical alignment mode. In contrast, the alignment film 40 of the present invention can effectively prevent impurities generated during the photo-alignment treatment from dissolving into the liquid crystal layer 30.

Figure 3:
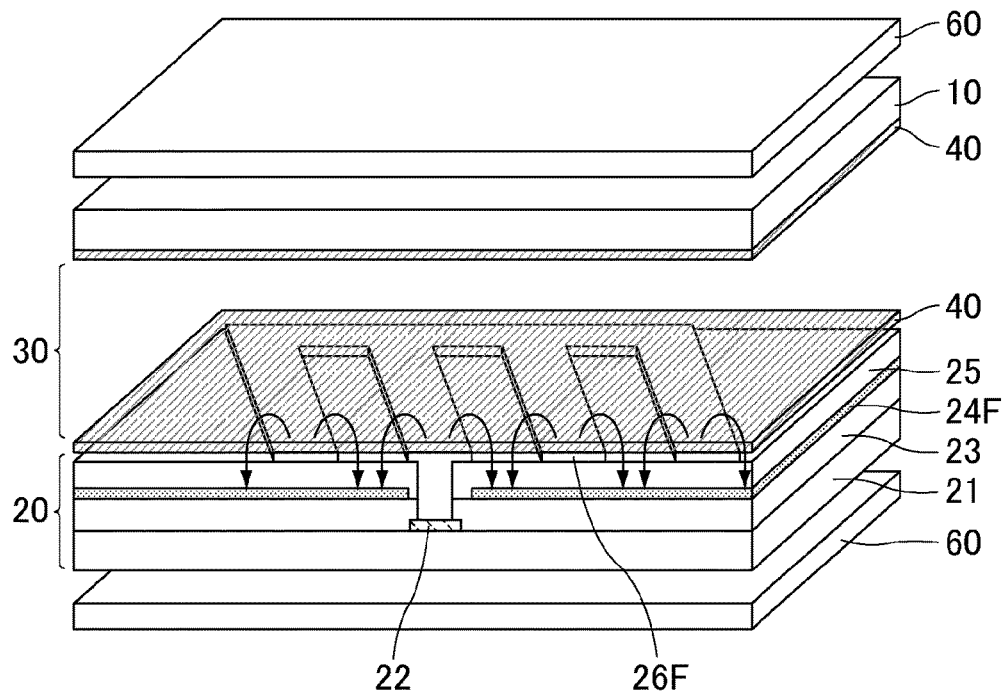
FIG. 3 is a schematic perspective view of the structure of a FFS-mode liquid crystal display panel.

FIG. 3 is a schematic perspective view of the structure of a FFS-mode liquid crystal display panel. In the FFS mode which is one example of the horizontal alignment mode, at least one substrate includes a structure (FFS electrode structure) including a planar electrode 24F, a slit electrode 26F, and an insulating layer 25 disposed between the planar electrode 24F and the slit electrode 26F, and an oblique electric field (fringe electric field) is formed in the liquid crystal layer 30 adjacent to the substrate. In FIG. 3, the FFS electrode structure is disposed in the substrate 20. The slit electrode 26F, the insulating layer 25, and the planar electrode 24F are successively disposed from the liquid crystal layer 30 side. The slit electrode 26F is electrically connected through a contact hole (through hole) penetrating the insulating layers 23 and 25 to the drain electrode of a TFT 22 which is closer to the supporting substrate 21 than the planar electrode 24F is. The slit electrode 26F may be one including a linear opening as a slit entirely surrounded by the electrode, or may be comb-shaped one including multiple comb-tooth portions with linear cuts between the comb-tooth portions serving as slits, for example.

Figure 4:
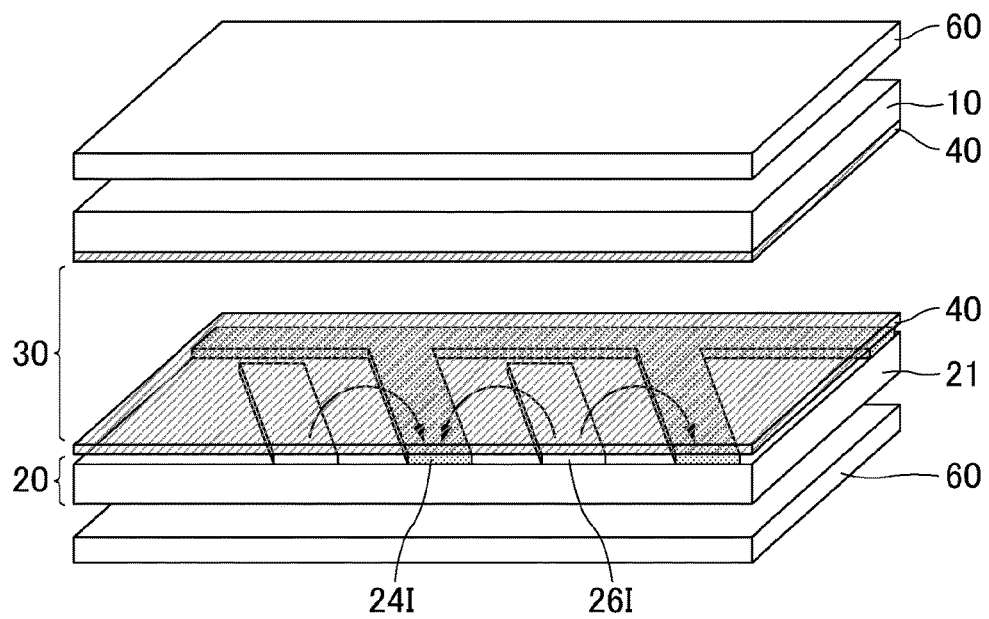
FIG. 4 is a schematic perspective view of the structure of an IPS-mode liquid crystal display panel.

FIG. 4 is a schematic perspective view of the structure of an IPS-mode liquid crystal display panel. In the IPS mode which is another example of the horizontal alignment mode, at least one substrate includes a pair of comb-shaped electrodes 24I and 26I, and a transverse electric field is formed in the liquid crystal layer 30 adjacent to the substrate. The comb-shaped electrodes 24I and 26I may be a pair of electrodes each of which includes multiple comb-tooth portions and which are disposed such that the comb-tooth portions are interdigitated with each other.

A polarizing plate (linear polarizer) 60 may be disposed on each of the substrates 10 and 20 on the side opposite to the liquid crystal layer 30. The polarizing plate 60 may typically be one obtained by aligning a dichroic anisotropic material such as an iodine complex adsorbed on a polyvinyl alcohol (PVA) film. Generally, each surface of the PVA film is laminated with a protective film such as a triacetyl cellulose film before the film is put into practical use. An optical film such as a retardation film may be disposed between the polarizing plate 60 and each of the substrates 10 and 20.

As illustrated in FIG. 1, the liquid crystal display device of the present embodiment includes a backlight 80 on the back surface side of the liquid crystal panel. A liquid crystal display device having such a configuration is usually called a transmissive liquid crystal display device. The backlight 80 may be any backlight that emits light including visible light, and may be one that emits light with only visible light or emits light including both visible light and ultraviolet light. In order to enable the liquid crystal display device to provide color display, a backlight emitting white light is suitable for the backlight 80. The type of the backlight 80 may preferably be a light emitting diode (LED), for example. The "visible light" herein means light (electromagnetic waves) having a wavelength of 380 nm to shorter than 800 nm.

The liquid crystal display device of the present embodiment has a configuration including, in addition to the liquid crystal panel and the backlight 80, multiple components such as external circuits, including a tape-carrier package (TCP) and a printed circuit board (PCB); optical films, including a viewing angle-increasing film and a luminance-increasing film; and a bezel (frame). Some components, if appropriate, may be incorporated into another component. In addition to the components described above, the liquid crystal display device may include any components that are usually used in the field of liquid crystal display devices. The additional components are therefore not described here.

Each and every detail described for the above embodiment of the present invention shall be applied to all the aspects of the present invention.

The present invention is described below in more detail based on examples. The examples, however, are not intended to limit the scope of the present invention.

Example 1

1. Synthesis of Alignment Film Material

A diamine compound (0.08 mol) represented by the following formula (A-1) and a tetraamine compound (0.02 mol) represented by the following formula (A-2) were dissolved in γ-butyrolactone. Next, an acid anhydride (0.10 mol) represented by the following formula (A-3) was added and the components were reacted at 60° C. for 12 hours. Thereby, a solution of polyamic acid which is a precursor of a horizontal alignment film (n=0.2) represented by the following formula (A-4) (liquid crystal aligning agent) was obtained. The weight average molecular weight of the polyamic acid was 5000 to 500000. If the weight average molecular weight is lower than 5000, a film having a sufficient thickness is less likely to be formed and a low-molecular-weight component is likely to dissolve into the liquid crystal layer. If the weight average molecular weight is higher than 500000, the viscosity of the liquid crystal aligning agent is too high to form a film.

2. Production of Liquid Crystal Cell

A TFT substrate including an indium-tin-oxide (ITO) transparent electrode with slits and a counter substrate without an electrode were prepared. The liquid crystal aligning agent obtained was applied to the TFT substrate and the counter substrate, and the workpieces were pre-baked at 90° C. for 5 minutes, and then baked at 230° C. for 40 minutes. Thereby, alignment films having the chemical structure represented by the above formula (A-4) were obtained. Subsequently, the surfaces of the alignment films were rubbed, so that alignment treatment was performed.

Next, a UV-curable sealant (trade name: Photolec S-WB, Sekisui Chemical Co., Ltd.) was applied in a predetermined pattern to one of the substrates using a dispenser. A positive liquid crystal composition was dropped to a predetermined position of the other substrate. Then, the substrates were attached in vacuo and the sealant was cured by ultraviolet light. Thereby, a liquid crystal cell was produced. In order to cancel the flow-induced alignment of the liquid crystal, the liquid crystal cell was heated at 130° C. for 40 minutes, subjected to re-alignment treatment for giving an isotropic phase to the liquid crystal, and then cooled down to room temperature. Thereby, a FFS-mode liquid crystal cell was obtained.

Examples 2 to 4, Comparative Example 1

FFS-mode liquid crystal cells of Examples 2 to 4 and Comparative Example 1 were produced in the same manner as in Example 1 except that the amounts of the diamine compound represented by the above formula (A-1) and the tetraamine compound represented by the above formula (A-2) were changed in preparation of the liquid crystal aligning agent. The n values of the above formula (A-4) in Examples 2 to 4 and Comparative Example 1 were as

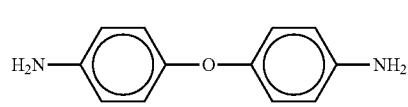

(A-1)

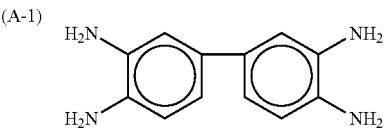

(A-2)

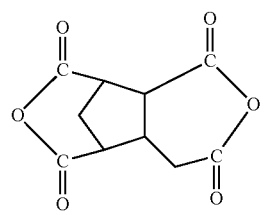

(A-3)

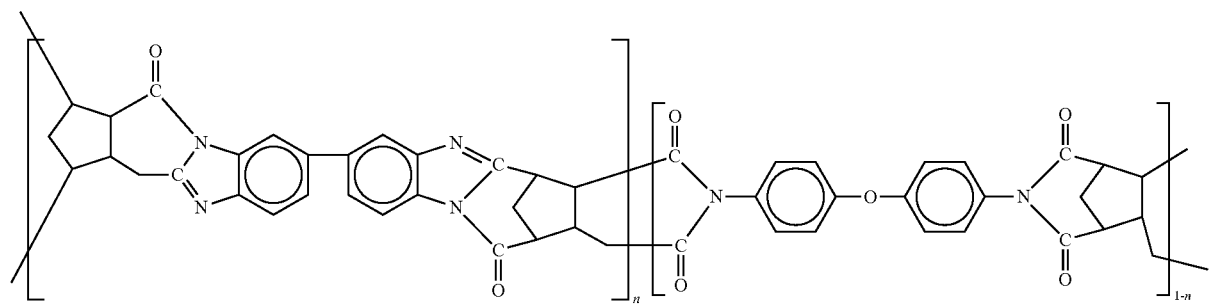

(A-4)

follows, and the amount of the tetraamine compound represented by the above formula (A-2) was 0 in Comparative Example 1.

Example 2: n=0.15
Example 3: n=0.10
Example 4: n=0.05
Comparative Example 1: n=0

<High-Temperature Test on Backlight>

In order to evaluate the heat resistance of each of the FFS-mode liquid crystal cells produced in Examples 1 to 4 and Comparative Example 1, a test was performed in which the liquid crystal cell was placed on a backlight in the ON state and was left for 200 hours while the temperature of the liquid crystal cell was increased up to 75° C. The voltage holding ratio (VHR) and the contrast were measured before and after the test, and the results are shown in the following Table 1. The VHR was measured using Model 6254 VHR measurement system (Toyo Corp.) at 1 V and 70° C. The contrast was measured using a spectroradiometer "SR-UL1R" (Topcon Technohouse Corp.) at 25° C.

TABLE 1

|  |  | Before test | | After 200-hour test | |
|---|---|---|---|---|---|
|  |  | VHR (%) | Contrast | VHR (%) | Contrast |
| Example 1 | n = 0.2 | 99.5 | 2000 | 99.5 | 2000 |
| Example 2 | n = 0.15 | 99.5 | 2000 | 99.5 | 2000 |
| Example 3 | n = 0.1 | 99.5 | 2000 | 99.5 | 2000 |
| Example 4 | n = 0.05 | 99.5 | 1700 | 99.5 | 1700 |
| Comparative Example 1 | n = 0 | 99.5 | 1000 | 99.4 | 950 |

As shown in the above Table 1, the FFS-mode liquid crystal cells of Examples 1 to 4 exhibited no reduction in VHR and contrast even after the 200-hour test at a temperature as high as 75° C. and on the backlight. In contrast, the FFS-mode liquid crystal cell of Comparative Example 1 exhibited reduction in VHR and contrast after the test.

In consideration of the test results of Examples 1 to 4, the reduction in VHR and contrast in Comparative Example 1 seems to be caused by the liquid crystal aligning agent, specifically by dissolution of the alignment film material into the liquid crystal. In Examples 1 to 4, reduction in VHR and contrast seems to be prevented owing to the introduction of the monomer unit represented by the formula (1) which has very low liquid crystal solubility.

In Examples 1 to 4, the contrast was also high before the test. The reason why the introduction of the monomer unit represented by the formula (1) leads to a high contrast seems to be as follows. That is, since the monomer unit represented by the formula (1) has high flatness, the degree of alignment of the alignment film is increased. This results in an increased degree of alignment of the liquid crystal and uniform film resistance.

Example 5

1. Synthesis of Alignment Film Material

A diamine compound (0.08 mol) represented by the following formula (B-1) and the tetraamine compound (0.02 mol) represented by the above formula (A-2) were dissolved in γ-butyrolactone. Next, an acid anhydride (0.10 mol) containing an azobenzene skeleton represented by the following formula (B-2) was added and the components were reacted at 60° C. for 12 hours. Thereby, a solution of polyamic acid which is a precursor of a horizontal photo-alignment film (n=0.2) represented by the following formula (B-3) (liquid crystal aligning agent) was obtained. The weight average molecular weight of the polyamic acid was adjusted to fall into the range of 5000 to 30000. If the weight average molecular weight is lower than 5000, a film having a sufficient thickness is less likely to be formed and a low-molecular-weight component is likely to dissolve into the liquid crystal layer. If the weight average molecular weight is higher than 30000, the azobenzene skeleton is less likely to be photo-isomerized by polarized UV irradiation due to steric hindrance in the polymer chain, preventing sufficient alignment.

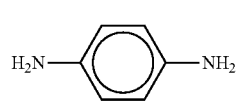

(B-1)

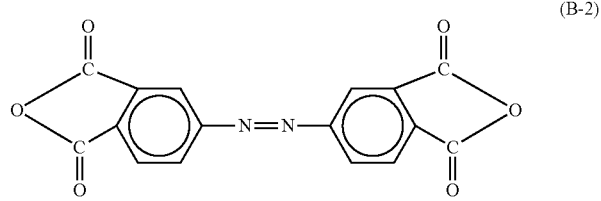

(B-2)

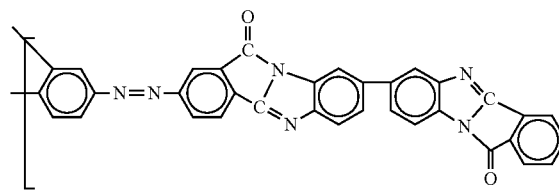

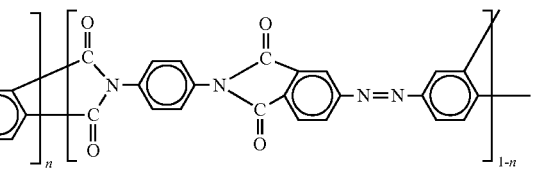

(B-3)

2. Production of Liquid Crystal Cell

A TFT substrate including an ITO transparent electrode with slits and a counter substrate without an electrode were prepared. The aligning agent obtained was applied to the TFT substrate and the counter substrate, and the workpieces were pre-baked at 90° C. for 5 minutes. Subsequently, the surfaces covered with the liquid crystal aligning agent were irradiated with 5 J/cm$^2$ of linearly polarized ultraviolet light whose center wavelength is 360 nm, so that alignment treatment was performed. Then, the workpieces were baked at 230° C. for 40 minutes. Thereby, alignment films having the chemical structure represented by the above formula (B-3) were obtained.

Next, a UV-curable sealant (trade name: Photolec S-WB, Sekisui Chemical Co., Ltd.) was applied in a predetermined pattern to one of the substrates using a dispenser. A negative liquid crystal composition was dropped to a predetermined position of the other substrate. Then, the substrates were attached in vacuo and the sealant was cured by ultraviolet light. Thereby, a liquid crystal cell was produced. In order to cancel the flow-induced alignment of the liquid crystal, the liquid crystal cell was heated at 130° C. for 40 minutes, subjected to re-alignment treatment for giving an isotropic phase to the liquid crystal, and then cooled down to room temperature. Thereby, a FFS-mode liquid crystal cell was obtained.

Examples 6 to 8, Comparative Example 2

FFS-mode liquid crystal cells of Examples 6 to 8 and Comparative Example 2 were produced in the same manner as in Example 5 except that the amounts of the diamine compound represented by the above formula (B-1) and the tetraamine compound represented by the above formula (A-2) were changed in preparation of the liquid crystal aligning agent. The n values of the above formula (B-3) in Examples 6 to 8 and Comparative Example 2 were as follows, and the amount of the tetraamine compound represented by the above formula (A-2) was 0 in Comparative Example 2.
Example 6: n=0.15
Example 7: n=0.10
Example 8: n=0.05
Comparative Example 2: n=0
<High-Temperature Test on Backlight>
The FFS-mode liquid crystal cells produced in Examples 5 to 8 and Comparative Example 2 were subjected to the evaluation test similar to that in Example 1 and the others, and the results are shown in the following Table 2.

TABLE 2

| | | Before test | | After 200-hour test | |
|---|---|---|---|---|---|
| | | VHR (%) | Contrast | VHR (%) | Contrast |
| Example 5 | n = 0.2 | 99.5 | 2300 | 99.1 | 2200 |
| Example 6 | n = 0.15 | 99.5 | 2300 | 99.1 | 2200 |
| Example 7 | n = 0.1 | 99.5 | 2300 | 99.0 | 2200 |
| Example 8 | n = 0.05 | 99.5 | 1900 | 98.0 | 1600 |
| Comparative Example 2 | n = 0 | 99.5 | 1600 | 96.4 | 1200 |

As shown in the above Table 2, the FFS-mode liquid crystal cells of Examples 5 to 8 exhibited relatively small reduction in VHR and contrast even after the 200-hour test at a temperature as high as 75° C. and on the backlight. In contrast, the FFS-mode liquid crystal cell of Comparative Example 2 exhibited great reduction in VHR and contrast after the test.

In consideration of the test results of Examples 5 to 8, the great reduction in VHR and contrast in Comparative Example 2 seems to be caused by the liquid crystal aligning agent, specifically by generation of low-molecular-weight impurities due to decomposition of the photo-functional group in the main chain of the photo-alignment film affected by the backlight illumination, and dissolution of the resulting low-molecular-weight impurities into the liquid crystal.

In Examples 5 to 8, the reduction in VHR and contrast after the test seems to be suppressed owing to the introduction of the monomer unit represented by the formula (1). Specifically, even when the photo-functional group in the main chain is decomposed to generate low-molecular-weight impurities, the monomer unit represented by the formula (1) has very low liquid crystal solubility and therefore suppresses dissolution of the low-molecular-weight impurities into the liquid crystal.

In Examples 5 to 8, the contrast was also high before the test. The reason why the introduction of the monomer unit represented by the formula (1) leads to a high contrast seems to be as follows. That is, since the monomer unit represented by the formula (1) has high flatness, the degree of alignment of the alignment film is increased. This results in an increased degree of alignment of the liquid crystal and uniform film resistance.

Example 9

1. Synthesis of Alignment Film Material
A diamine compound (0.02 mol) containing a vertical alignment group represented by the following formula (C-1), a diamine compound (0.06 mol) represented by the following formula (C-2), and the tetraamine compound (0.02 mol) represented by the above formula (A-2) were dissolved in γ-butyrolactone. Next, the acid anhydride (0.10 mol) represented by the above formula (A-3) was added and the components were reacted at 60° C. for 12 hours. Thereby, a solution of polyamic acid which is a precursor of a vertical alignment film (n=0.2, m=0.2) represented by the following formula (C-3) (liquid crystal aligning agent) was obtained. The moieties derived from the diamine compounds in the vertical alignment film constitute the polyamic acid, and the moiety derived from the tetraamine compound functions to increase the thermal stability. The weight average molecular weight of the polyamic acid was 5000 to 500000. If the weight average molecular weight is lower than 5000, a film having a sufficient thickness is less likely to be formed and a low-molecular-weight component is likely to dissolve into the liquid crystal layer. If the weight average molecular weight is higher than 500000, the viscosity of the liquid crystal aligning agent is too high to form a film.

(C-1)

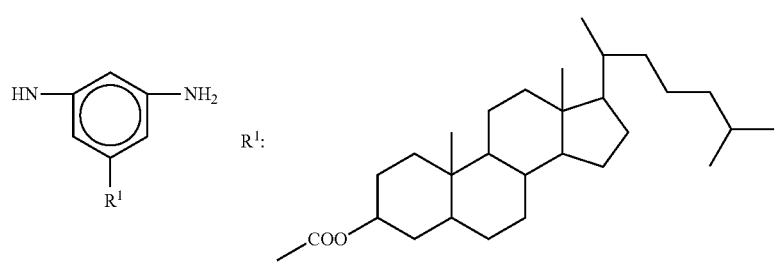

(C-2)

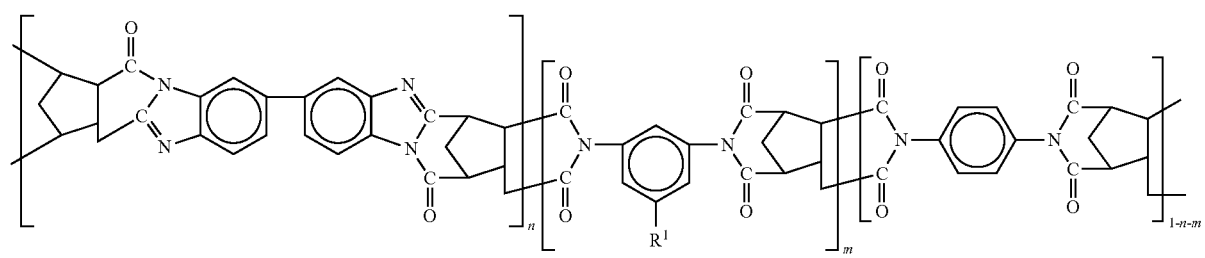

(C-3)

2. Production of Liquid Crystal Cell

A TFT substrate and a counter substrate each including an ITO transparent electrode were prepared. The transparent electrode of the TFT substrate was provided with slits, while the transparent electrode of the counter substrate was disposed on the entire surface of the substrate and was not provided with any slit. The liquid crystal aligning agent obtained was applied to the TFT substrate and the counter substrate, and the workpieces were pre-baked at 90° C. for 5 minutes, and then baked at 230° C. for 40 minutes. Thereby, alignment films having the chemical structure represented by the above formula (C-3) were obtained.

Next, a UV-curable sealant (trade name: Photolec S-WB, Sekisui Chemical Co., Ltd.) was applied in a predetermined pattern to one of the substrates using a dispenser. A negative liquid crystal composition was dropped to a predetermined position of the other substrate. Then, the substrates were attached in vacuo and the sealant was cured by ultraviolet light. Thereby, a liquid crystal cell was produced. In order to cancel the flow-induced alignment of the liquid crystal, the liquid crystal cell was heated at 130° C. for 40 minutes, subjected to re-alignment treatment for giving an isotropic phase to the liquid crystal, and then cooled down to room temperature. Thereby, a VA-mode liquid crystal cell was obtained.

Examples 10 to 12, Comparative Example 3

VA-mode liquid crystal cells of Examples 10 to 12 and Comparative Example 3 were produced in the same manner as in Example 9 except that the amounts of the diamine compound containing a vertical alignment group represented by the above formula (C-1), the diamine compound represented by the above formula (C-2), and the tetraamine compound represented by the above formula (A-2) were changed in preparation of the liquid crystal aligning agent. The n and m values of the above formula (C-3) in Examples 10 to 12 and Comparative Example 3 were as follows, and the amount of the tetraamine compound represented by the above formula (A-2) was 0 in Comparative Example 3.

Example 10: n=0.15, m=0.2
Example 11: n=0.10, m=0.2
Example 12: n=0.05, m=0.2
Comparative Example 3: n=0, m=0.2

<High-Temperature Test on Backlight>

The VA-mode liquid crystal cells produced in Examples 9 to 12 and Comparative Example 3 were subjected to the evaluation test similar to that in Example 1 and the others, and the results are shown in the following Table 3.

TABLE 3

| | | Before test | | After 200-hour test | |
|---|---|---|---|---|---|
| | | VHR (%) | Contrast | VHR (%) | Contrast |
| Example 9 | n = 0.2 | 99.5 | 5500 | 99.5 | 5500 |
| Example 10 | n = 0.15 | 99.5 | 5500 | 99.5 | 5500 |
| Example 11 | n = 0.1 | 99.5 | 5500 | 99.1 | 5500 |
| Example 12 | n = 0.05 | 99.5 | 5000 | 98.5 | 5000 |
| Comparative Example 3 | n = 0 | 99.5 | 5000 | 97.5 | 4700 |

As shown in the above Table 3, the VA-mode liquid crystal cells of Examples 9 to 12 exhibited very smaller reduction in VHR and contrast before and after the test than the VA-mode liquid crystal cell of Comparative Example 3.

In consideration of the test results of Examples 9 to 12, the reduction in VHR and contrast in Comparative Example 3 seems to be mainly caused by the liquid crystal aligning agent, specifically by slight dissolution of the vertical alignment film material itself having a relatively low molecular weight into the liquid crystal due to heat because the vertical alignment group slightly dissolves into the liquid crystal.

In Examples 9 to 12, the reduction in VHR and contrast after the test was suppressed owing to the introduction of the monomer unit represented by the formula (1). The specific reason why VHR reduction was suppressed seems to be as follows. That is, side chains become less likely to dissociate as the stiffness of the molecules increases, and the hardness of the film increases and the dissociated side chains are less likely to dissolve into the liquid crystal as the stiffness of the molecules increases. The specific reason why contrast reduction was suppressed seems to be as follows. That is, since the monomer unit represented by the formula (1) has high flatness, the degree of alignment of the alignment film is increased. This results in stabilized liquid crystal alignment, suppressed dissolution of the molecules constituting the alignment film into the liquid crystal, and uniform film resistance.

Example 13

1. Synthesis of Alignment Film Material

A diamine compound (0.08 mol) containing a vertical alignment group represented by the following formula (D-1) and the tetraamine compound (0.02 mol) represented by the above formula (A-2) were dissolved in γ-butyrolactone. Next, the acid anhydride (0.10 mol) represented by the above formula (A-3) was added and the components were reacted at 60° C. for 12 hours. Thereby, a solution of polyamic acid which is a precursor of a vertical photo-alignment film (n=0.2) represented by the following formula (D-2) (liquid crystal aligning agent) was obtained. The weight average molecular weight of the polyamic acid was 5000 to 500000. If the weight average molecular weight is lower than 5000, a film having a sufficient thickness is less likely to be formed and a low-molecular-weight component is likely to dissolve into the liquid crystal layer. If the weight average molecular weight is higher than 500000, the viscosity of the liquid crystal aligning agent is too high to form a film.

as in Example 13 except that the amounts of the diamine compound containing a vertical alignment group represented by the above formula (D-1) and the tetraamine compound represented by the above formula (A-2) were changed in preparation of the liquid crystal aligning agent. The n values of the above formula (D-2) in Examples 14 to 16 and Comparative Example 4 were as follows, and the amount of the tetraamine compound represented by the above formula (A-2) was 0 in Comparative Example 4.

Example 14: n=0.15
Example 15: n=0.10

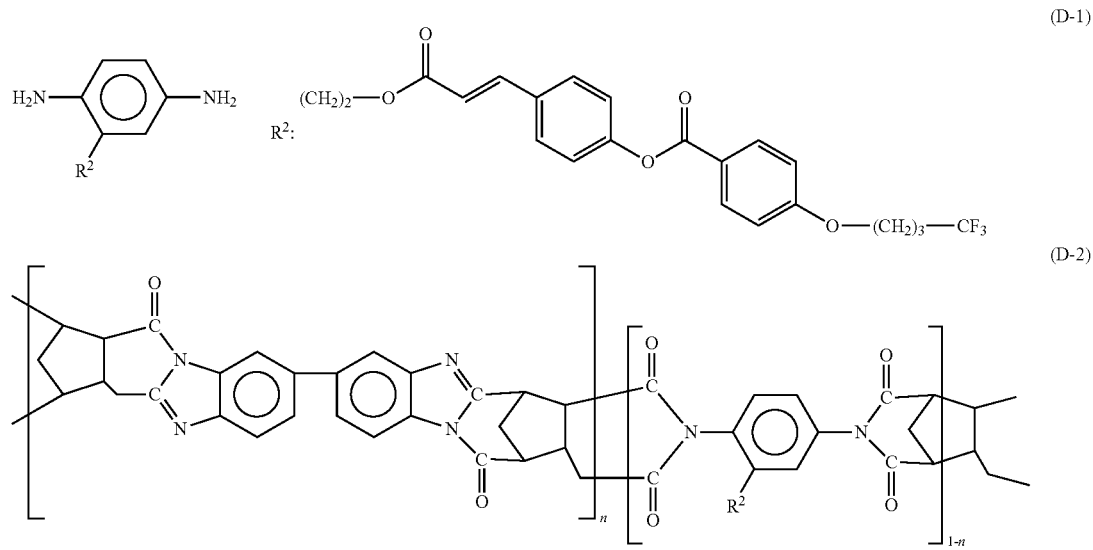

2. Production of Liquid Crystal Cell

A TFT substrate and a counter substrate each including an ITO transparent electrode on the entire surface were prepared. The liquid crystal aligning agent obtained was applied to the TFT substrate and the counter substrate, and the workpieces were pre-baked at 90° C. for 5 minutes, and then baked at 230° C. for 40 minutes. Thereby, alignment films having the chemical structure represented by the above formula (D-2) were obtained. Subsequently, the surfaces of the alignment films were irradiated with 50 mJ/cm² of linearly polarized ultraviolet light whose center wavelength is 330 nm, so that alignment treatment was performed.

Next, a UV-curable sealant (trade name: Photolec S-WB, Sekisui Chemical Co., Ltd.) was applied in a predetermined pattern to one of the substrates using a dispenser. A negative liquid crystal composition was dropped to a predetermined position of the other substrate. Then, the substrates were attached in vacuo and the sealant was cured by ultraviolet light. Thereby, a liquid crystal cell was produced. In order to cancel the flow-induced alignment of the liquid crystal, the liquid crystal cell was heated at 130° C. for 40 minutes, subjected to re-alignment treatment for giving an isotropic phase to the liquid crystal, and then cooled down to room temperature. Thereby, a RTN-mode liquid crystal cell was obtained.

Examples 14 to 16, Comparative Example 4

RTN-mode liquid crystal cells of Examples 14 to 16 and Comparative Example 4 were produced in the same manner Example 16: n=0.05
Comparative Example 4: n=0

<High-Temperature Test on Backlight>

The RTN-mode liquid crystal cells produced in Examples 13 to 16 and Comparative Example 4 were subjected to the evaluation test similar to that in Example 1 and the others, and the results are shown in the following Table 4.

TABLE 4

|  |  | Before test | | After 200-hour test | |
|---|---|---|---|---|---|
|  |  | VHR (%) | Contrast | VHR (%) | Contrast |
| Example 13 | n = 0.2 | 99.5 | 6500 | 99.0 | 6500 |
| Example 14 | n = 0.15 | 99.5 | 6500 | 99.0 | 6500 |
| Example 15 | n = 0.1 | 99.5 | 6500 | 98.5 | 6500 |
| Example 16 | n = 0.05 | 99.5 | 6000 | 98.0 | 6000 |
| Comparative Example 4 | n = 0 | 99.5 | 6000 | 95.0 | 5500 |

As shown in the above Table 4, the RTN-mode liquid crystal cells of Examples 13 to 16 exhibited very smaller reduction in VHR and contrast before and after the test than the RTN-mode liquid crystal cell of Comparative Example 4.

In consideration of the test results of Examples 13 to 16, the reduction in VHR and contrast in Comparative Example 4 seems to be mainly caused by the liquid crystal aligning agent, specifically by degradation and decomposition of the vertical photo-alignment film due to the backlight illumination, and dissolution of the decomposition product into the liquid crystal. VHR reduction and contrast reduction were suppressed owing to the introduction of the monomer unit represented by the formula (1). The reason why VHR reduction after the test was suppressed seems to be as follows. That is, side chains become less likely to dissociate as the stiffness of the molecules increases, and the hardness of the film increases and the dissociated side chains are less likely to dissolve into the liquid crystal as the stiffness of the molecules increases. The reason why contrast reduction after the test was suppressed seems to be as follows. That is, since the monomer unit represented by the formula (1) has high flatness, the degree of alignment of the alignment film is increased. This results in stabilized liquid crystal alignment, suppressed dissolution of the molecules constituting the alignment film into the liquid crystal, and uniform film resistance.

Example 17

1. Synthesis of Alignment Film Material

The diamine compound (0.08 mol) represented by the above formula (B-1) and a tetraamine compound (0.02 mol) containing an azobenzene skeleton represented by the following formula (E-1) were dissolved in γ-butyrolactone.

Next, the acid anhydride (0.10 mol) containing an azobenzene skeleton represented by the above formula (B-2) was added and the components were reacted at 60° C. for 12 hours. Thereby, a solution of polyamic acid which is a precursor of a horizontal photo-alignment film (n=0.2) represented by the following formula (E-2) (liquid crystal aligning agent) was obtained. The weight average molecular weight of the polyamic acid was adjusted to fall into the range of 5000 to 30000. If the weight average molecular weight is lower than 5000, a film having a sufficient thickness is less likely to be formed and a low-molecular-weight component is likely to dissolve into the liquid crystal layer. If the weight average molecular weight is higher than 30000, the azobenzene skeleton is less likely to be photo-isomerized by polarized UV irradiation due to steric hindrance in the polymer chain, preventing sufficient alignment.

2. Production of Liquid Crystal Cell

A TFT substrate including an ITO transparent electrode with slits and a counter substrate without an electrode were prepared. The liquid crystal aligning agent obtained was applied to the TFT substrate and the counter substrate, and the workpieces were pre-baked at 90° C. for 5 minutes. Subsequently, the surfaces covered with the liquid crystal aligning agent were irradiated with 5 J/cm² of linearly polarized ultraviolet light whose center wavelength is 360 nm, so that alignment treatment was performed. Then, the workpieces were baked at 230° C. for 40 minutes. Thereby, alignment films having the chemical structure represented by the above formula (E-2) were obtained.

Next, a UV-curable sealant (trade name: Photolec S-WB, Sekisui Chemical Co., Ltd.) was applied in a predetermined pattern to one of the substrates using a dispenser. A negative liquid crystal composition was dropped to a predetermined position of the other substrate. Then, the substrates were attached in vacuo and the sealant was cured by ultraviolet light. Thereby, a liquid crystal cell was produced. In order to cancel the flow-induced alignment of the liquid crystal, the liquid crystal cell was heated at 130° C. for 40 minutes, subjected to re-alignment treatment for giving an isotropic phase to the liquid crystal, and then cooled down to room temperature. Thereby, a FFS-mode liquid crystal cell was obtained.

Examples 18 to 20, Comparative Example 5

FFS-mode liquid crystal cells of Examples 18 to 20 and Comparative Example 5 were produced in the same manner as in Example 17 except that the amounts of the diamine compound represented by the above formula (B-1) and the tetraamine compound represented by the above formula (E-1) were changed in preparation of the liquid crystal aligning agent. The n values of the above formula (E-2) in Examples 18 to 20 and Comparative Example 5 were as follows, and the amount of the tetraamine compound represented by the above formula (E-1) was 0 in Comparative Example 5.

Example 18: n=0.15
Example 19: n=0.10
Example 20: n=0.05
Comparative Example 5: n=0

<High-Temperature Test on Backlight>

The FFS-mode liquid crystal cells produced in Examples 17 to 20 and Comparative Example 5 were subjected to the evaluation test similar to that in Example 1 and the others, and the results are shown in the following Table 5.

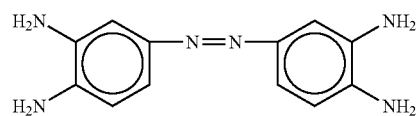
(E-1)

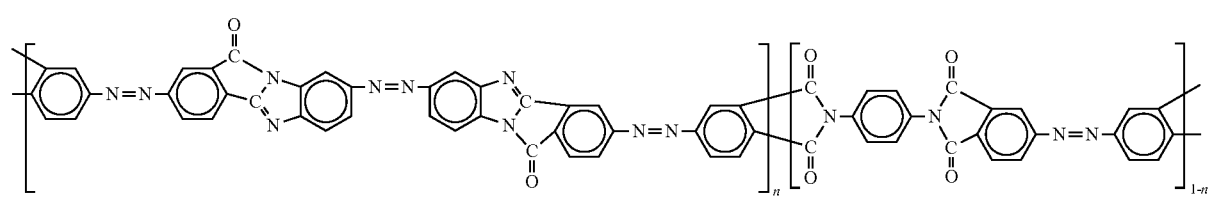
(E-2)

TABLE 5

| | | Before test | | After 200-hour test | |
|---|---|---|---|---|---|
| | | VHR (%) | Contrast | VHR (%) | Contrast |
| Example 17 | n = 0.2 | 99.5 | 2400 | 99.1 | 2400 |
| Example 18 | n = 0.15 | 99.5 | 2400 | 99.1 | 2200 |
| Example 19 | n = 0.1 | 99.5 | 2300 | 99.0 | 2200 |
| Example 20 | n = 0.05 | 99.5 | 2000 | 98.0 | 1700 |

TABLE 5-continued

|  |  | Before test | | After 200-hour test | |
|---|---|---|---|---|---|
|  |  | VHR (%) | Contrast | VHR (%) | Contrast |
| Comparative Example 5 | n = 0 | 99.5 | 1600 | 96.4 | 1200 |

As shown in the above Table 5, the FFS-mode liquid crystal cells of Examples 17 to 20 exhibited very smaller reduction in VHR and contrast before and after the test than the FFS-mode liquid crystal cell of Comparative Example 5.

In consideration of the test results of Examples 17 to 20, the reduction in VHR and contrast in Comparative Example 5 seems to be mainly caused by the liquid crystal aligning agent, specifically by generation of low-molecular-weight impurities due to decomposition of the photo-functional group in the main chain of the horizontal photo-alignment film affected by the backlight illumination, and dissolution of the low-molecular-weight impurities into the liquid crystal. The reduction in VHR and contrast after the test seems to be suppressed owing to the introduction of the monomer unit represented by the formula (1). Specifically, even when the photo-functional group in the main chain is decomposed into low-molecular-weight components, the monomer unit represented by the formula (1) has very low solubility and therefore suppresses dissolution thereof into the liquid crystal.

in an increased degree of alignment of the liquid crystal and uniform film resistance.

Example 21

1. Synthesis of Alignment Film Material

The diamine compound (0.08 mol) represented by the above formula (B-1) and a tetraamine compound (0.02 mol) containing a chalconyl skeleton represented by the following formula (F-1) were dissolved in γ-butyrolactone. Next, an acid anhydride (0.10 mol) containing a chalconyl skeleton represented by the following formula (F-2) was added and the components were reacted at 60° C. for 12 hours. Thereby, a solution of polyamic acid which is a precursor of a horizontal photo-alignment film (n=0.2) represented by the following formula (F-3) (liquid crystal aligning agent) was obtained. The weight average molecular weight of the polyamic acid was adjusted to fall into the range of 5000 to 30000. If the weight average molecular weight is lower than 5000, a film having a sufficient thickness is less likely to be formed and a low-molecular-weight component is likely to dissolve into the liquid crystal layer. If the weight average molecular weight is higher than 30000, the chalconyl skeleton is less likely to be photo-isomerized or photo-dimerized by polarized UV irradiation due to steric hindrance in the polymer chain, preventing sufficient alignment.

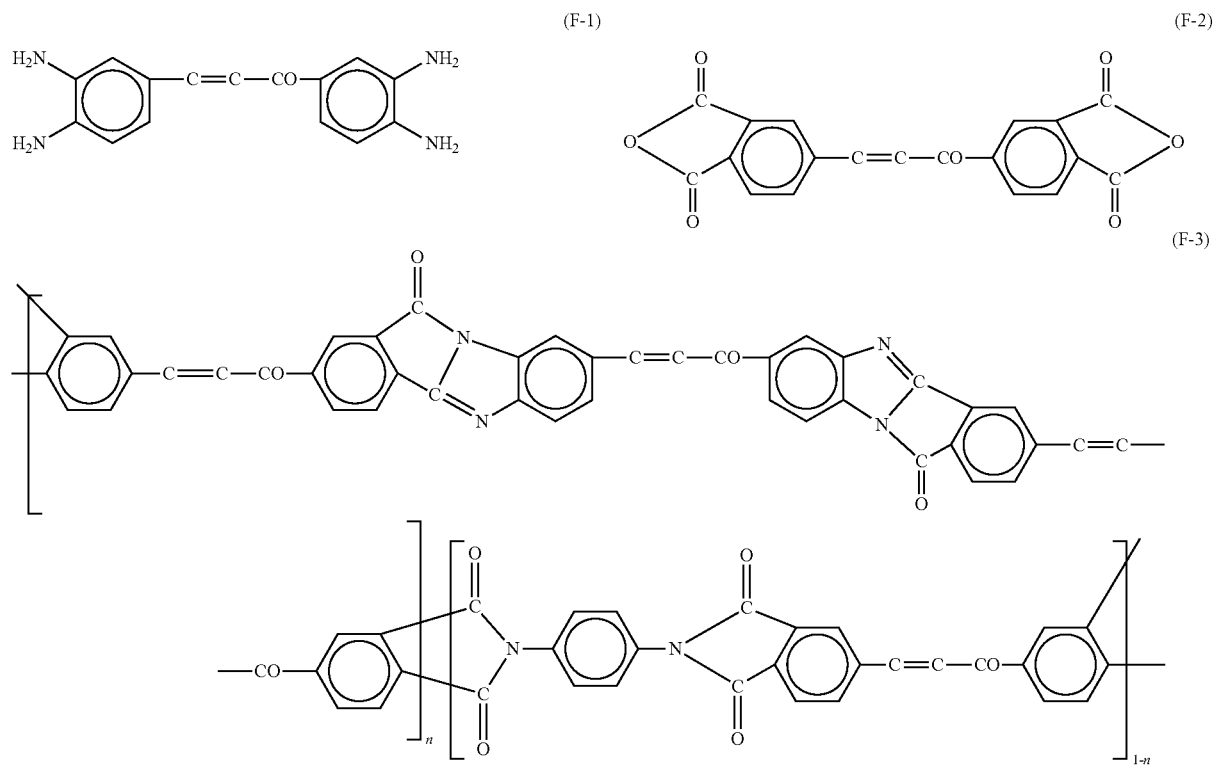

In Examples 17 to 20, the contrast was also high before the test. The reason why the introduction of the monomer unit represented by the formula (1) leads to a high contrast seems to be as follows. That is, since the monomer unit represented by the formula (1) has high flatness, the degree of alignment of the alignment film is increased. This results 2. Production of Liquid Crystal Cell A TFT substrate including an ITO transparent electrode with slits and a counter substrate without an electrode were prepared. The liquid crystal aligning agent obtained was applied to the TFT substrate and the counter substrate, and the workpieces were pre-baked at 90° C. for 5 minutes. Subsequently, the surfaces covered with the liquid crystal aligning agent were irradiated with 5 J/cm² of linearly polarized ultraviolet light whose center wavelength is 360 nm, so that alignment treatment was performed. Then, the workpieces were baked at 230° C. for 40 minutes. Thereby, alignment films having the chemical structure represented by the above formula (F-3) were obtained.

Next, a UV-curable sealant (trade name: Photolec S-WB, Sekisui Chemical Co., Ltd.) was applied in a predetermined pattern to one of the substrates using a dispenser. A negative liquid crystal composition was dropped to a predetermined position of the other substrate. Then, the substrates were attached in vacuo and the sealant was cured by ultraviolet light. Thereby, a liquid crystal cell was produced. In order to cancel the flow-induced alignment of the liquid crystal, the liquid crystal cell was heated at 130° C. for 40 minutes, subjected to re-alignment treatment for giving an isotropic phase to the liquid crystal, and then cooled down to room temperature. Thereby, a FFS-mode liquid crystal cell was obtained.

Examples 22 to 24, Comparative Example 6

FFS-mode liquid crystal cells of Examples 22 to 24 and Comparative Example 6 were produced in the same manner as in Example 21 except that the amounts of the diamine compound represented by the above formula (B-1) and the tetraamine compound containing a chalconyl skeleton represented by the above formula (F-1) were changed in preparation of the liquid crystal aligning agent. The n values of the above formula (F-3) in Examples 22 to 24 and Comparative Example 6 were as follows, and the amount of the tetraamine compound represented by the above formula (F-1) was 0 in Comparative Example 6.

Example 22: n=0.15
Example 23: n=0.10
Example 24: n=0.05
Comparative Example 6: n=0

<High-Temperature Test on Backlight>

The FFS-mode liquid crystal cells produced in Examples 21 to 24 and Comparative Example 6 were subjected to the evaluation test similar to that in Example 1 and the others, and the results are shown in the following Table 6.

TABLE 6

|  |  | Before test | | After 200-hour test | |
|---|---|---|---|---|---|
|  |  | VHR (%) | Contrast | VHR (%) | Contrast |
| Example 21 | n = 0.2 | 99.5 | 2400 | 99.4 | 2400 |
| Example 22 | n = 0.15 | 99.5 | 2400 | 99.4 | 2400 |
| Example 23 | n = 0.1 | 99.5 | 2300 | 99.4 | 2300 |
| Example 24 | n = 0.05 | 99.5 | 2000 | 98.8 | 1800 |
| Comparative Example 6 | n = 0 | 99.5 | 1600 | 97.9 | 1300 |

As shown in the above Table 6, the FFS-mode liquid crystal cells of Examples 21 to 24 exhibited smaller reduction in VHR and contrast before and after the test than the FFS-mode liquid crystal cell of Comparative Example 6.

In consideration of the test results of Examples 21 to 24, the reduction in VHR and contrast in Comparative Example 6 seems to be mainly caused by the liquid crystal aligning agent, specifically by generation of low-molecular-weight impurities due to decomposition of the photo-functional group in the main chain of the horizontal photo-alignment film affected by the backlight illumination, and dissolution of the low-molecular-weight impurities into the liquid crys-tal. However, the reduction in VHR and contrast after the test was smaller than that in Examples 5 to 8 and 17 to 20. This seems to be because the photo-functional group is not an azobenzene group but a chalconyl group, so that the backlight illumination is less likely to be absorbed. The reduction in VHR and contrast after the test seems to be suppressed owing to the use of a chalconyl group as the photo-functional group and the introduction of the monomer unit represented by the formula (1). Specifically, the photo-functional group in the main chain is less likely to be decomposed and, even if it is photolyzed to generate low-molecular-weight impurities, the monomer unit represented by the formula (1) has very low liquid crystal solubility and therefore suppresses dissolution of the low-molecular-weight impurities into the liquid crystal.

[Additional Remarks]

One embodiment of the present invention may also be an alignment film containing a copolymer containing a repeating structural unit represented by the following formula (1):

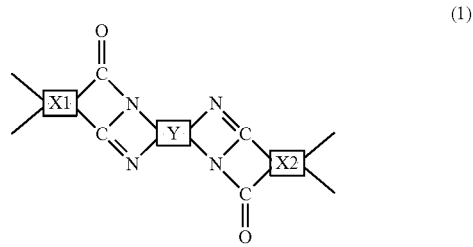

(1)

wherein X1 and X2 may be the same as or different from each other, and are each a structure represented by the following formula (X-1), (X-2), (X-3), (X-4), (X-5), (X-6), (X-7), (X-8), (X-9), (X-P1), (X-P2), (X-P3), or (X-P4), where a hydrogen atom may be replaced; and Y is a structure represented by the following formula (Y-1), (Y-2), (Y-3), (Y-4), (Y-5), (Y-6), (Y-7), (Y-8), (Y-9), (Y-10), (Y-11), (Y-12), (Y-P1), (Y-P2), (Y-P3), or (Y-P4), where a hydrogen atom may be replaced.

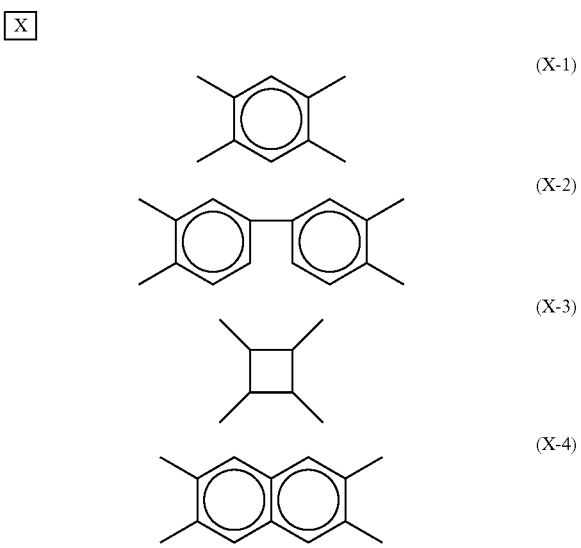

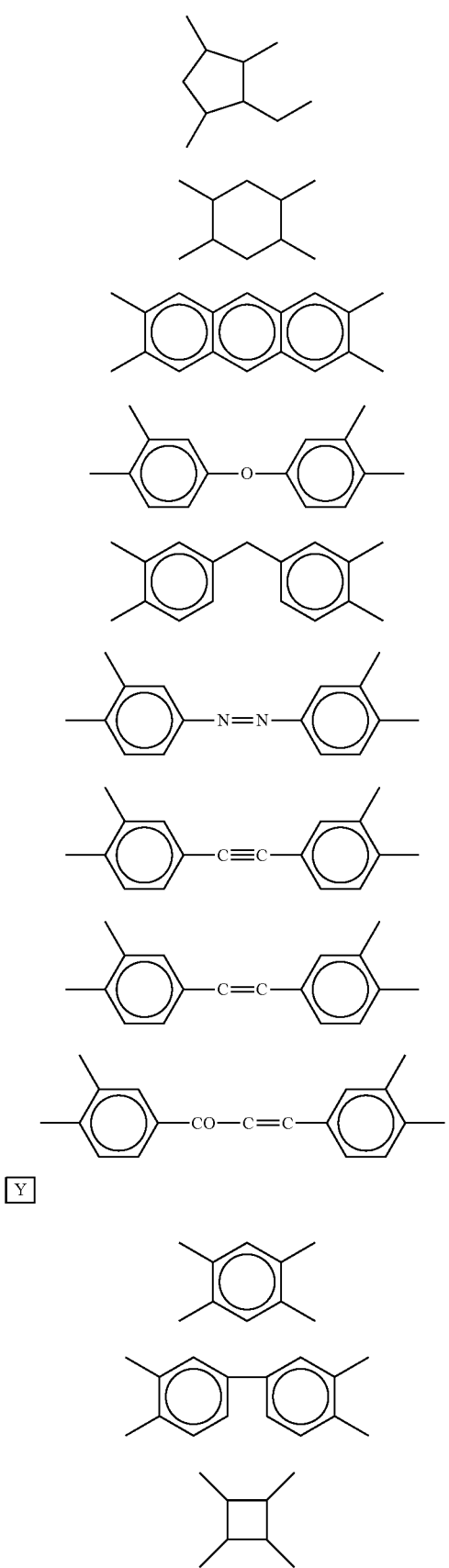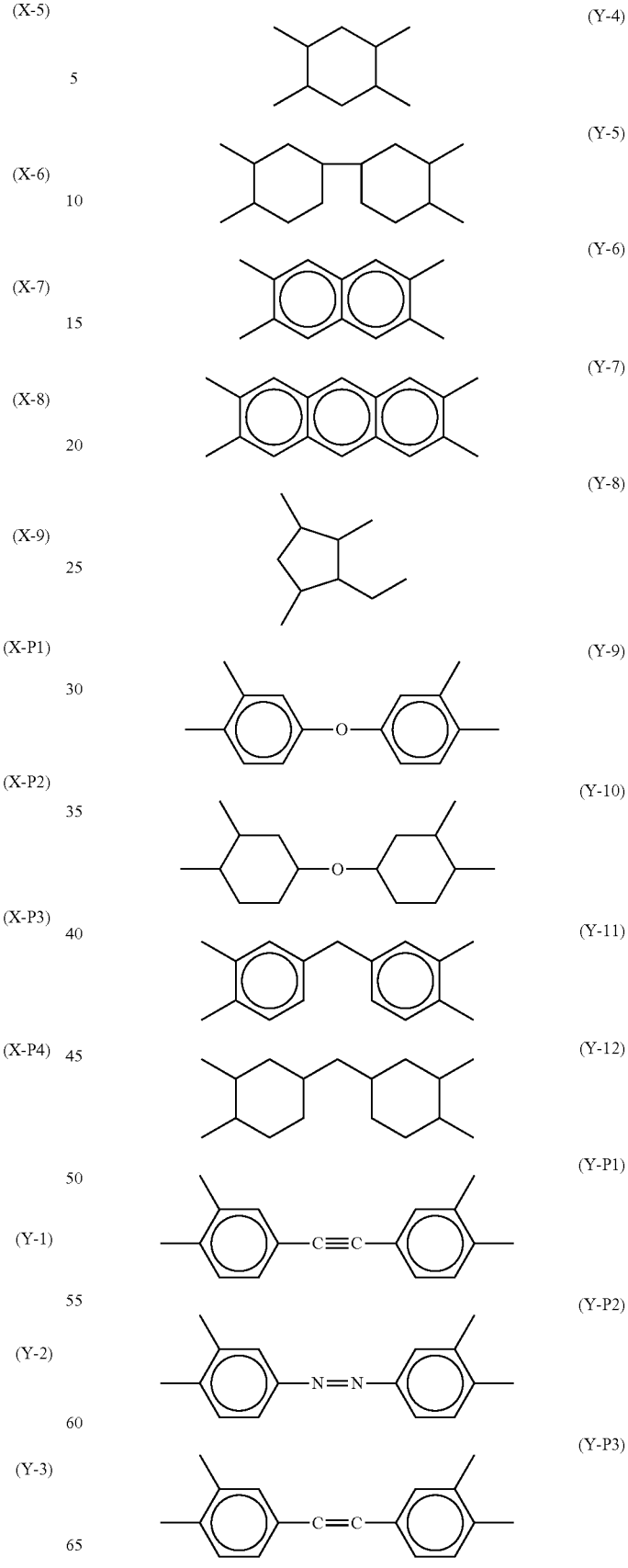

-continued

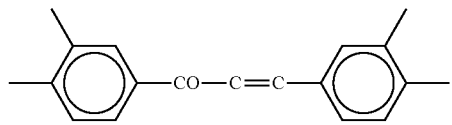
(Y-P4)

In the alignment film of the above embodiment, the copolymer constituting the alignment film has a stiff molecular structure. Thus, the copolymer is less likely to change in conformation, preventing dissolution of low-molecular-weight components into the liquid crystal. As a result, the alignment film can prevent generation of display defects such as image sticking and stain in the liquid crystal display device.

The repeating structural unit represented by the formula (1) may or may not contain a photo-alignable moiety. If the repeating structural unit represented by the formula (1) contains no photo-alignable moiety, X1 and X2 may be the same as or different from each other, and are each a structure represented by the above formula (X-1), (X-2), (X-3), (X-4), (X-5), (X-6), (X-7), (X-8), or (X-9); and Y is a structure represented by the above formula (Y-1), (Y-2), (Y-3), (Y-4), (Y-5), (Y-6), (Y-7), (Y-8), (Y-9), (Y-10), (Y-11), or (Y-12). If the repeating structural unit represented by the formula (1) contains a photo-alignable moiety, at least one of X1, X2, and Y is a photo-reactive structure, and the photo-reactive structure is a structure represented by any of the above formulas (X-P1), (X-P2), (X-P3), (X-P4), (Y-P1), (Y-P2), (Y-P3), and (Y-P4).

The copolymer preferably contains a repeating structural unit represented by the following formula (2):

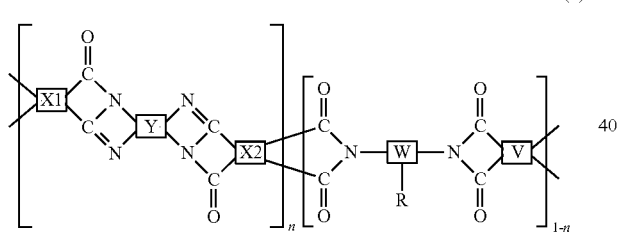
(2)

wherein n represents the proportion of the structural units represented by the formula (1) in the structural units represented by the above formula (2), and is a real number greater than 0 and smaller than 1; V is a structure represented by the following formula (V-1), (V-2), (V-3), (V-4), (V-5), (V-6), (V-7), (V-8), (V-9), (V-P1), (V-P2), (V-P3), or (V-P4), where a hydrogen atom may be replaced; W is a structure represented by the following formula (W-1), (W-2), (W-3), (W-4), (W-5), (W-6), (W-7), (W-8), (W-9), (W-10), (W-11), (W-12), (W-13), (W-14), (W-15), (W-16), (W-P1), (W-P2), (W-P3), (W-P4), (W-P5), (W-P6), (W-P7), or (W-P8), where a hydrogen atom may be replaced; and R is a horizontal alignment group or a vertical alignment group.

V

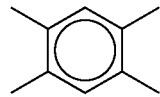
(V-1)

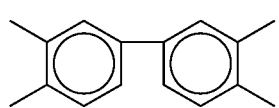
(V-2)

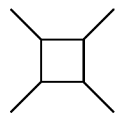
(V-3)

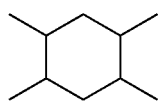
(V-4)

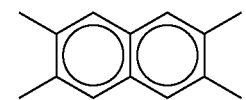
(V-5)

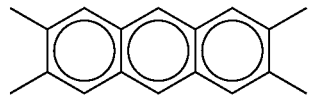
(V-6)

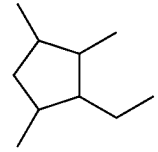
(V-7)

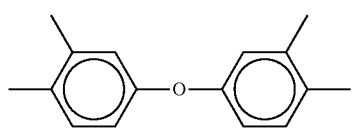
(V-8)

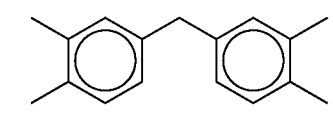
(V-9)

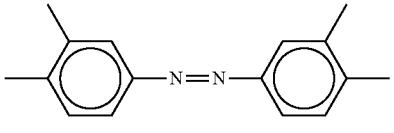
(V-P1)

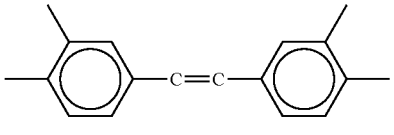
(V-P2)

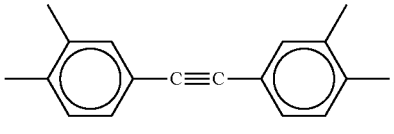
(V-P3)

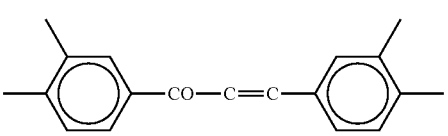
(V-P4)

W

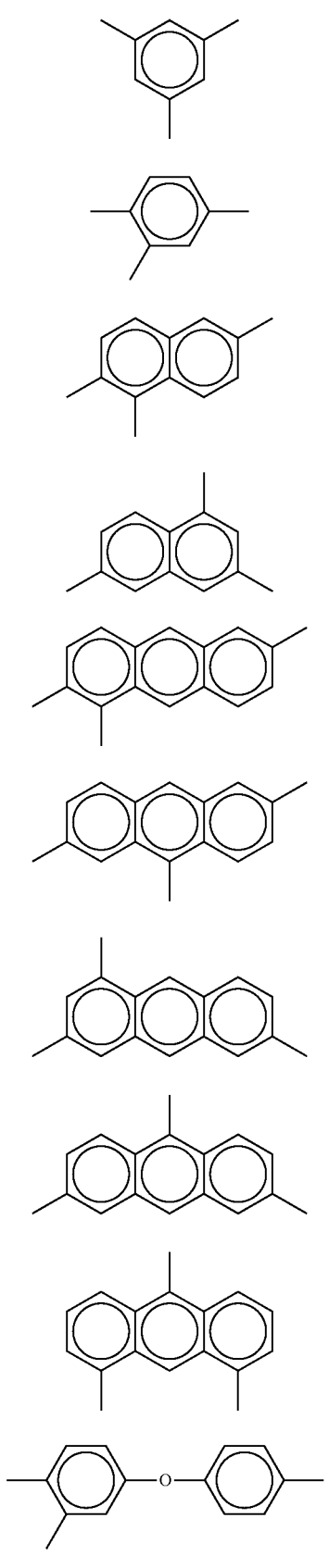
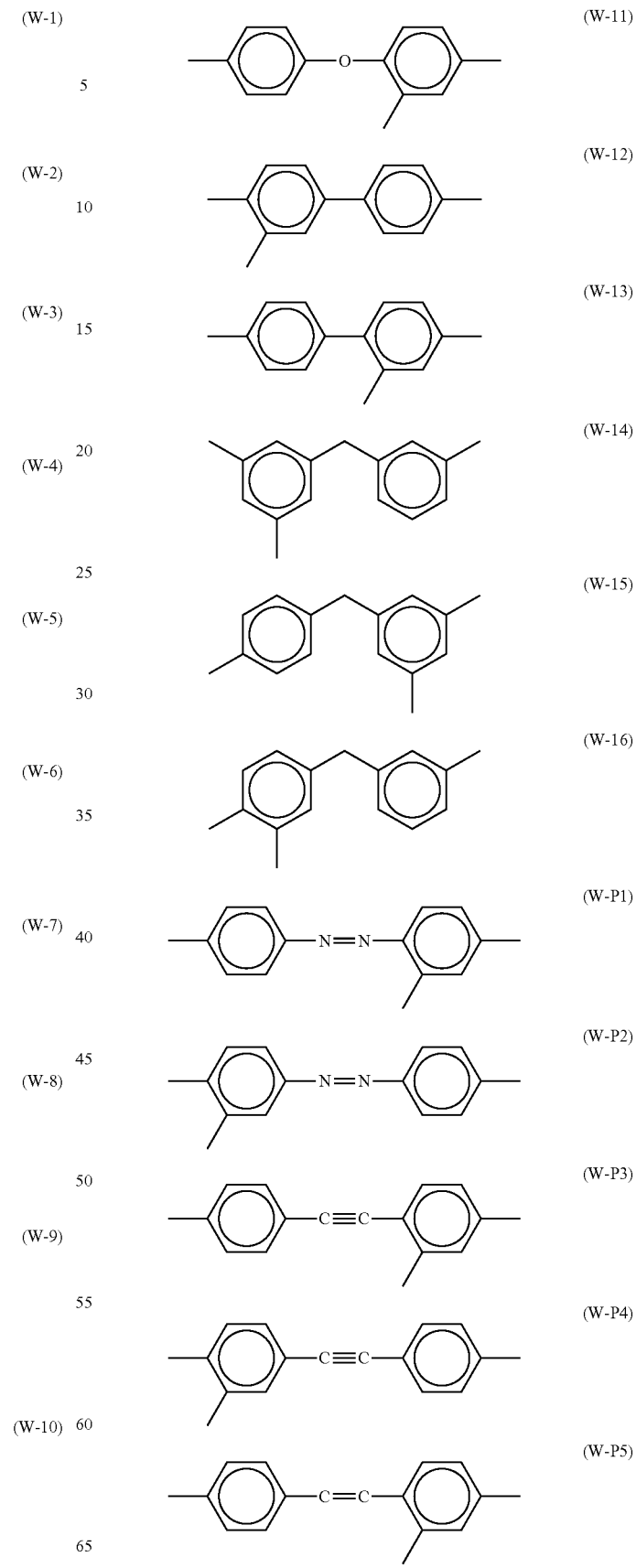

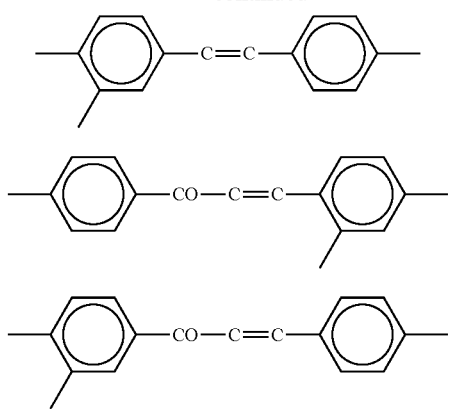

(W-P6)

(W-P7)

(W-P8)

The repeating structural unit represented by the above formula (2) can sufficiently provide an effect of improving the film formability in any application method such as an ink-jet method and a printing method in addition to the effect of suppressing dissolution of a low-molecular-weight component owing to the structural unit represented by the formula (1).

The repeating structural unit represented by the above formula (2) may or may not contain a photo-alignable moiety. If the repeating structural unit represented by the above formula (2) contains no photo-alignable moiety, X1 and X2 may be the same as or different from each other, and are each a structure represented by the above formula (X-1), (X-2), (X-3), (X-4), (X-5), (X-6), (X-7), (X-8), or (X-9); Y is a structure represented by the above formula (Y-1), (Y-2), (Y-3), (Y-4), (Y-5), (Y-6), (Y-7), (Y-8), (Y-9), (Y-10), (Y-11), or (Y-12); V is a structure represented by the above formula (V-1), (V-2), (V-3), (V-4), (V-5), (V-6), (V-7), (V-8), or (V-9); and W is a structure represented by the above formula (W-1), (W-2), (W-3), (W-4), (W-5), (W-6), (W-7), (W-8), (W-9), (W-10), (W-11), (W-12), (W-13), (W-14), (W-15), or (W-16). If the repeating structural unit represented by the above formula (2) contains a photo-alignable moiety, at least one of X1, X2, Y, V, and W is a photo-reactive structure, and the photo-reactive structure is a structure represented by any of the above formulas (X-P1), (X-P2), (X-P3), (X-P4), (Y-P1), (Y-P2), (Y-P3), (Y-P4), (V-P1), (V-P2), (V-P3), (V-P4), (W-P1), (W-P2), (W-P3), (W-P4), (W-P5), (W-P6), (W-P7), and (W-P8).

If R is a horizontal alignment group, R may be a structure represented by the following formula (R-H1), (R-H2), (R-H3), (R-H4), (R-H5), (R-H6), (R-H7), or (R-H8), for example.

—H (R-H1)

—CH₃ (R-H2)

—C₂H₅ (R-H3)

—CF₃ (R-H4)

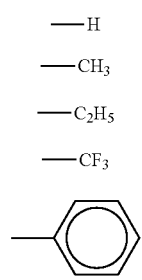 (R-H5)

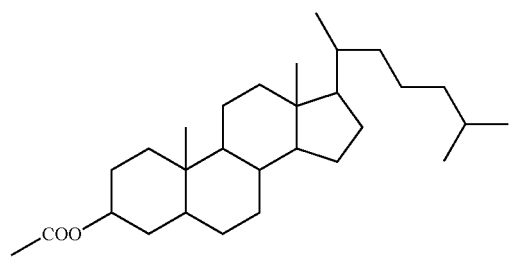

(R-H6)

(R-H7)

(R-H8)

If R is a vertical alignment group, R may be a structure represented by the following formula (R-V1), (R-V2), (R-V3), (R-V4), (R-V5), (R-V6), or (R-V7), for example.

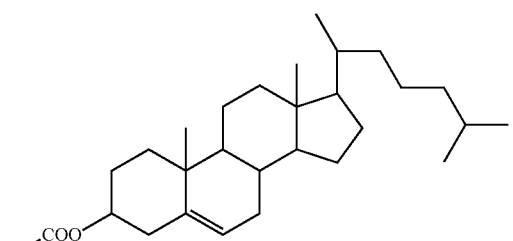

(R-V1)

(R-V2)

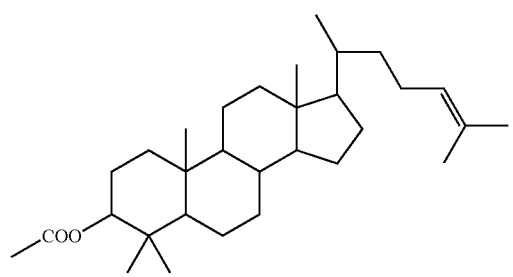

(R-V3)

(R-V4)

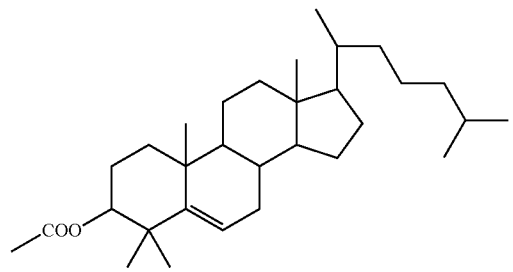

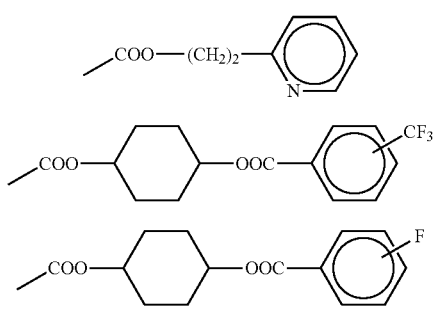

(R-V5)

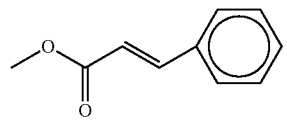

(R-V6)

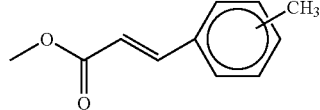

(R-V7)

R may contain a photo-reactive functional group. R containing a photo-reactive functional group allows the alignment film to be applicable to photo-alignment treatment. The photo-reactive functional group is preferably any of a cinnamate group, a chalcone group, an azobenzene group, a coumarin group, a tolane group, and a stilbene group. These photo-reactive functional groups have an absorption spectrum whose long wavelength side overlaps the short wavelength side of the emission spectrum of the backlight. Thus, they may disadvantageously be decomposed by application of the backlight illumination. On the contrary, use of the copolymer containing a repeating structural unit represented by the formula (1) prevents the decomposed photo-reactive functional group from dissolving into the liquid crystal.

If R is a horizontal alignment group, the photo-reactive functional group is preferably a structure represented by the following formula (R-HP1) or (R-HP2).

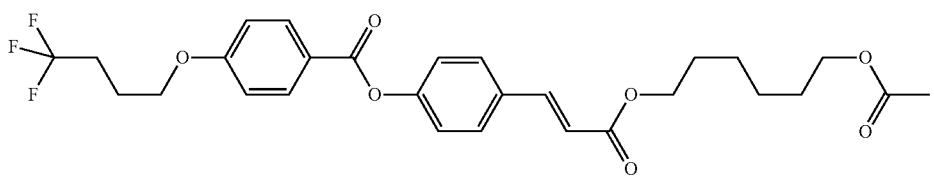

(R-HP1)

(R-HP2)

If R is a vertical alignment group, the photo-reactive functional group is preferably a structure represented by the following formula (R-VP1), (R-VP2), (R-VP3), (R-VP4), (R-VP5), (R-VP6), (R-VP7), (R-VP8), (R-VP9), (R-VP10), (R-VP11), (R-VP12), (R-VP13), (R-VP14), (R-VP15), (R-VP16), (R-VP17), (R-VP18), (R-VP19), (R-VP20), or (R-VP21).

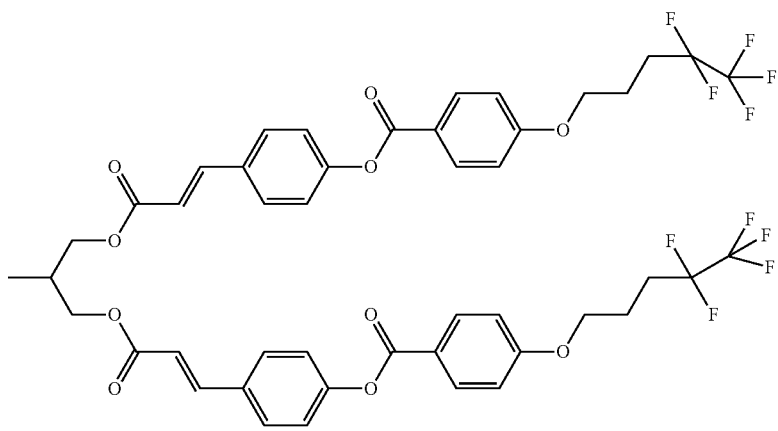

(R-VP1)

(R-VP2)

-continued
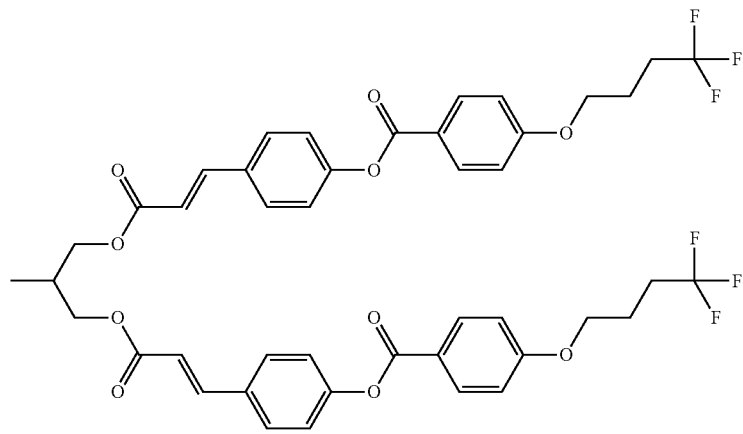
(R-VP3)
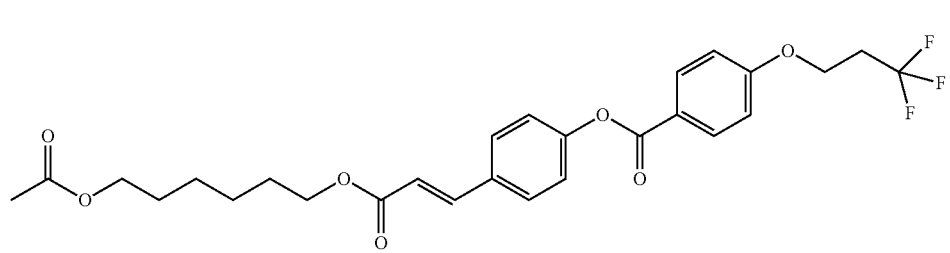
(R-VP4)
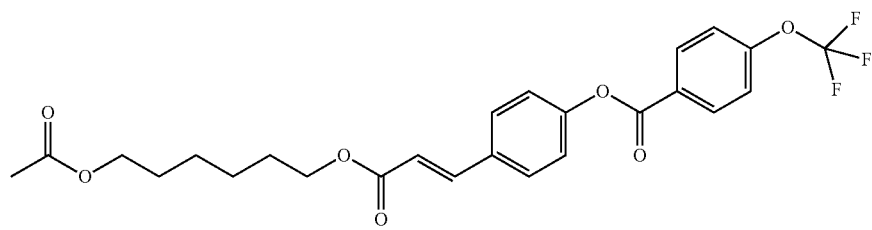
(R-VP5)
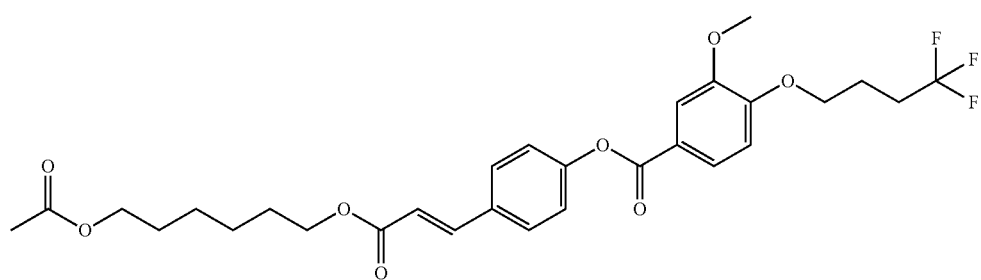
(R-VP6)
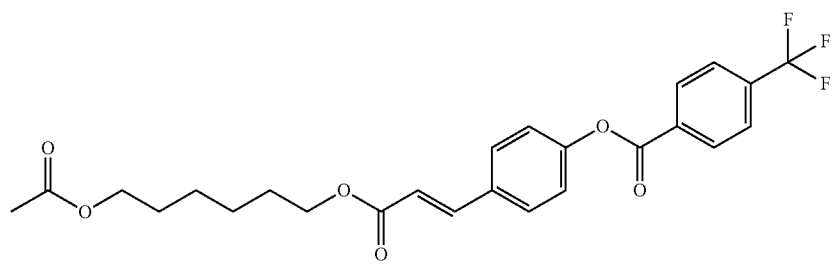
(R-VP7)

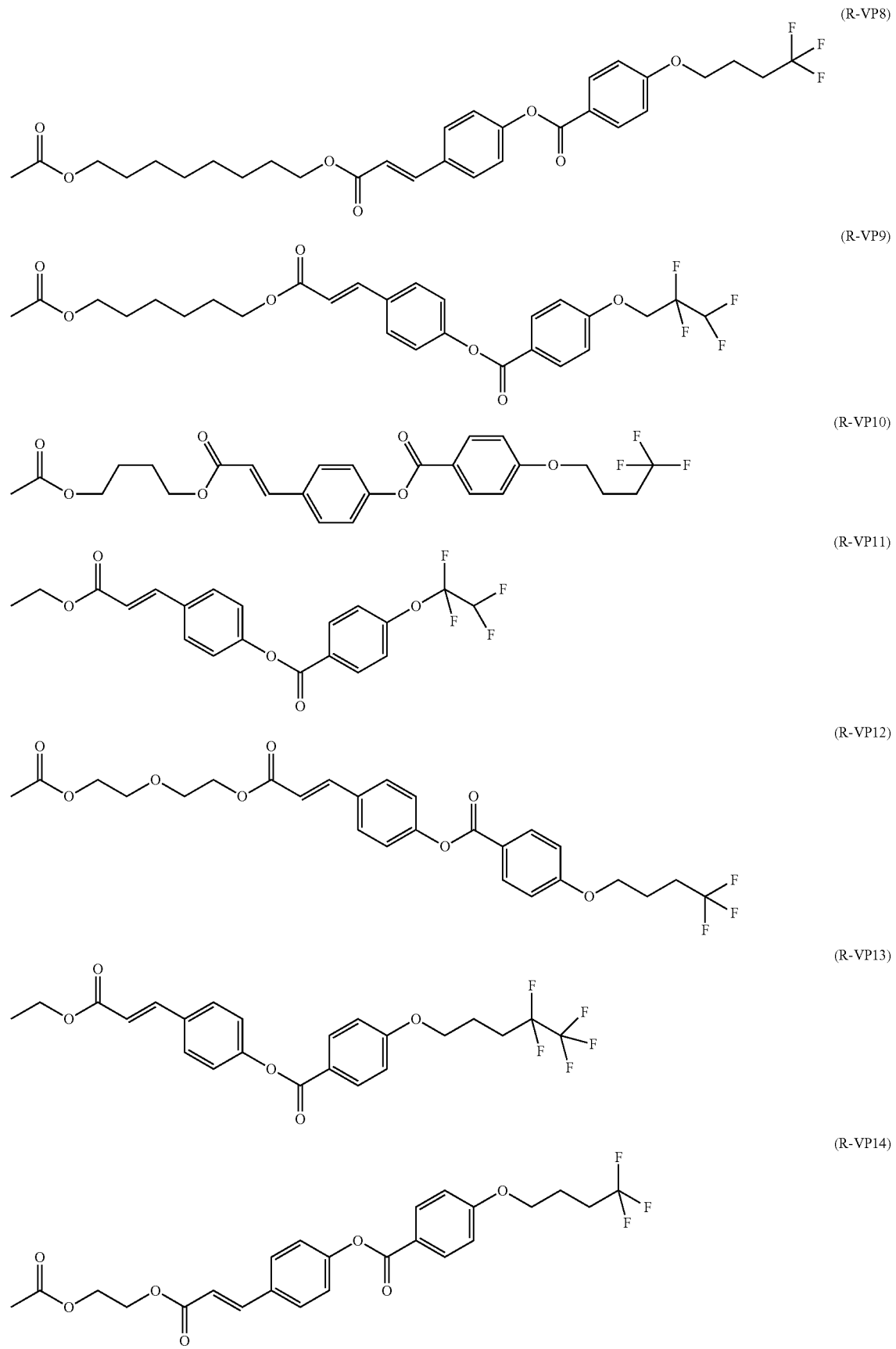

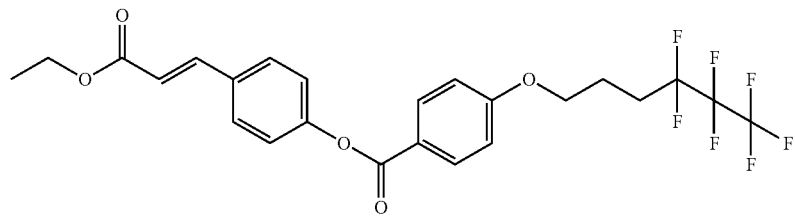
(R-VP15)
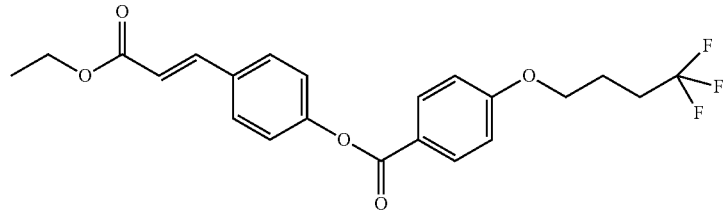
(R-VP16)
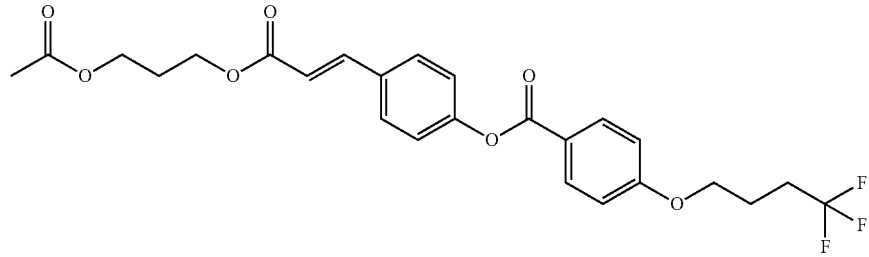
(R-VP17)
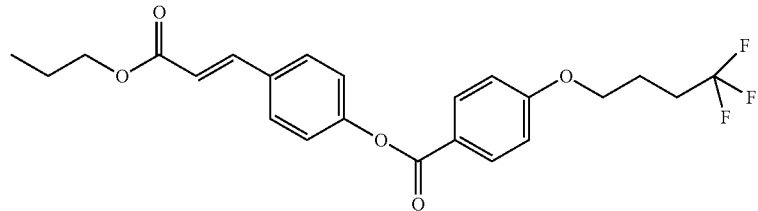
(R-VP18)
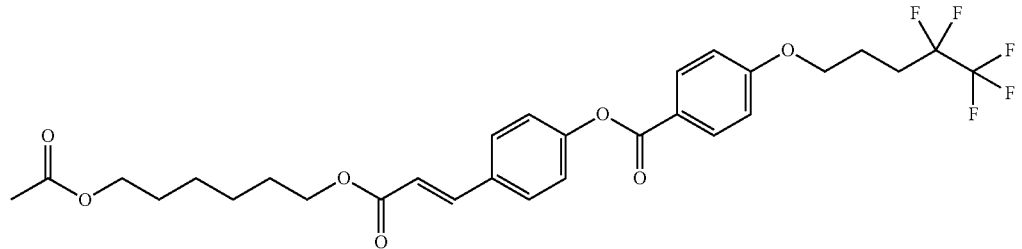
(R-VP19)
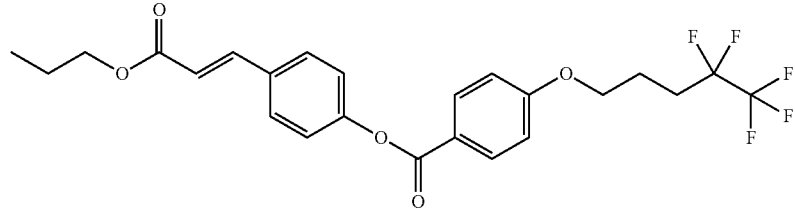
(R-VP20)

-continued

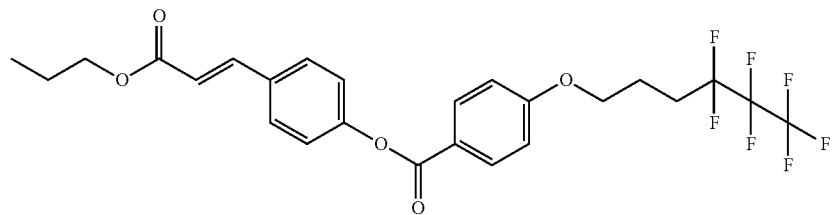
(R-VP21)

Another embodiment of the present invention may be a liquid crystal display device including a pair of substrates and a liquid crystal layer disposed between the substrates, at least one of the substrates including an alignment film on a surface on the liquid crystal layer side, the alignment film optionally being the alignment film containing a copolymer containing a repeating structural unit represented by the formula (1). Since the liquid crystal display device of the above embodiment includes the aforementioned alignment film, it can prevent generation of display defects such as image sticking and stain, achieving high display quality.

REFERENCE SIGNS LIST

10, 20: substrate
21: supporting substrate
22: TFT
23, 25: insulating layer
24F: planer electrode
24I: comb-shaped electrode
26F: slit electrode
26I: comb-shaped electrode
30: liquid crystal layer
40: alignment film
50: sealing material
60: polarizing plate
80: backlight

The invention claimed is:
1. An alignment film comprising:
a copolymer containing a repeating structural unit represented by the following formula (1):

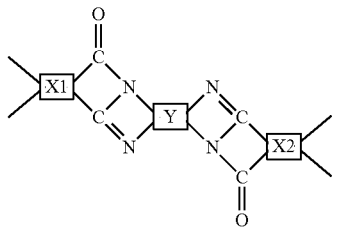
(1)

wherein
X1 and X2 may be the same as or different from each other and are each a structure represented by the following formula (X-1), (X-2), (X-3), (X-4), (X-5), (X-6), (X-7), (X-8), (X-9), (X-P1), (X-P2), (X-P3), or (X-P4), where a hydrogen atom may be replaced,
Y is a structure represented by the following formula (Y-1), (Y-2), (Y-3), (Y-4), (Y-5), (Y-6), (Y-7), (Y-8), (Y-9), (Y-10), (Y-11), (Y-12), (Y-P1), (Y-P2), (Y-P3), or (Y-P4), where a hydrogen atom may be replaced, at least one of X1, X2, and Y is a photo-reactive structure, and the photo-reactive structure is a structure represented by any of the formulas (X-P1), (X-P2), (X-P3), (X-P4), (Y-P1), (Y-P2), (Y-P3), and (Y-P4),

X

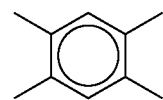
(X-1)

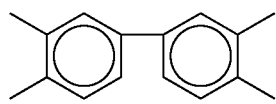
(X-2)

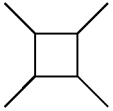
(X-3)

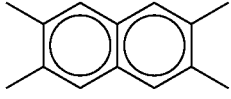
(X-4)

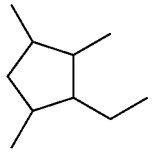
(X-5)

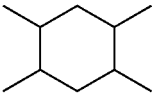
(X-6)

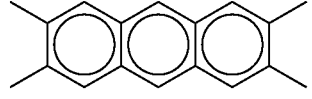
(X-7)

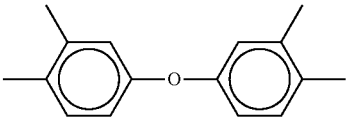
(X-8)

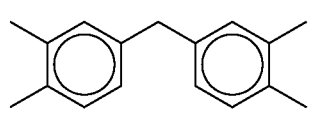
(X-9)

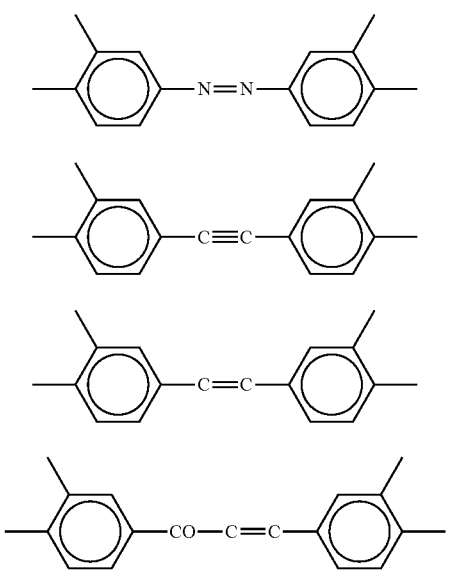
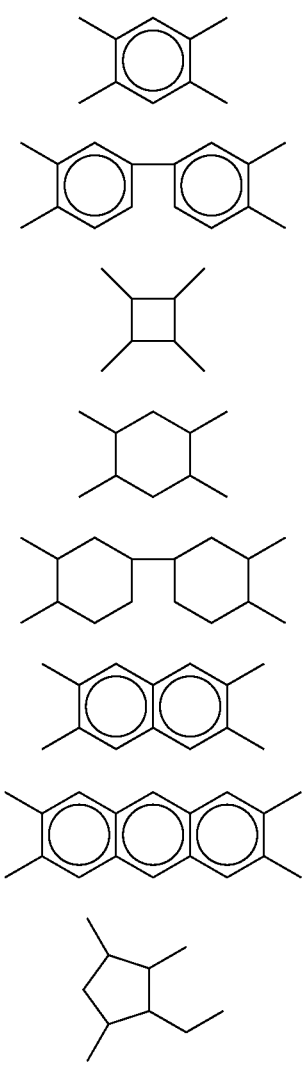
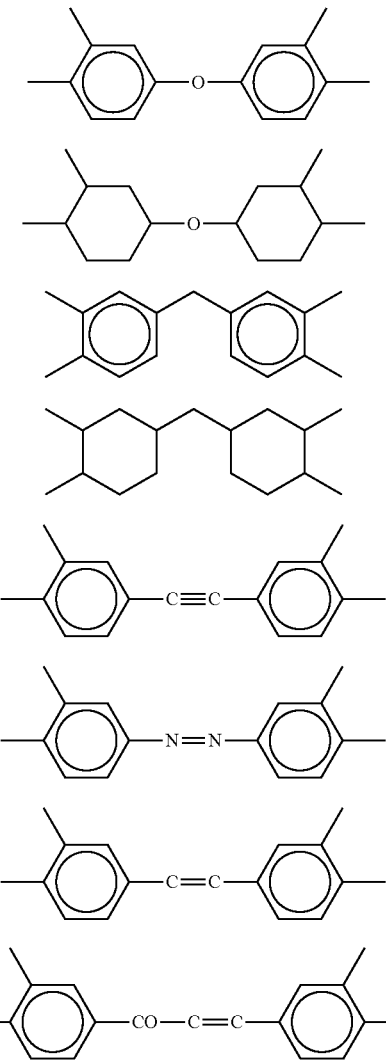

2. A liquid crystal display device comprising
a pair of substrates and a liquid crystal layer disposed between the substrates,
at least one of the substrates including an alignment film on a surface on the liquid crystal layer side,
the alignment film being the alignment film according to claim 1.

3. An alignment film comprising:
a copolymer containing a repeating structural unit represented by the following formula (1):

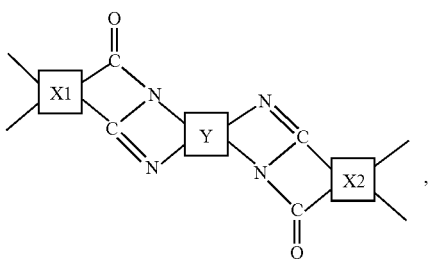

wherein
- X1 and X2 may be the same as or different from each other and are each a structure represented by the following formula (X-1), (X-2), (X-3), (X-4), (X-5), (X-6), (X-7), (X-8), (X-9), (X-P1), (X-P2), (X-P3), or (X-P4), where a hydrogen atom may be replaced,
- Y is a structure represented by the following formula (Y-1), (Y-2), (Y-3), (Y-4), (Y-5), (Y-6), (Y-7), (Y-8), (Y-9), (Y-10), (Y-11), (Y-12), (Y-P1), (Y-P2), (Y-P3), or (Y-P4), where a hydrogen atom may be replaced,
- the copolymer contains a repeating structural unit represented by the following formula (2):

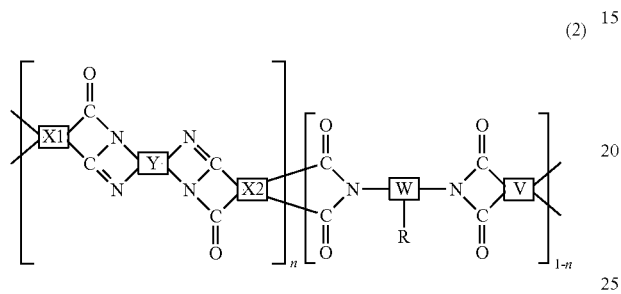

(2)

where n is a real number greater than 0 and smaller than 1;
- V is a structure represented by one of the following formulas (V-1), (V-2), (V-3), (V-4), (V-5), (V-6), (V-7), (V-8), (V-9), (V-P1), (V-P2), (V-P3), or (V-P4), where a hydrogen atom may be replaced;
- W is a structure represented by the following formula (W-1), (W-2), (W-3), (W-4), (W-5), (W-6), (W-7), (W-8), (W-9), (W-10), (W-11), (W-12), (W-13), (W-14), (W-15), (W-16), (W-P1), (W-P2), (W-P3), (W-P4), (W-P5), (W-P6), (W-P7), or (W-P8), where a hydrogen atom may be replaced; and R is a horizontal alignment group or a vertical alignment group,
- at least one of X1, X2, Y, V, and W is a photo-reactive structure, and
- the photo-reactive structure is a structure represented by any of the above formulas (X-P1), (X-P2), (X-P3), (X-P4), (Y-P1), (Y-P2), (Y-P3), (Y-P4), (V-P1), (V-P2), (V-P3), (V-P4), (W-P1), (W-P2), (W-P3), (W-P4), (W-P5), (W-P6), (W-P7), and (W-P8,

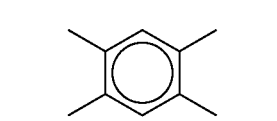
(X-10)

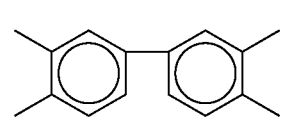
(X-2)

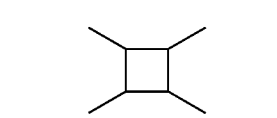
(X-3)

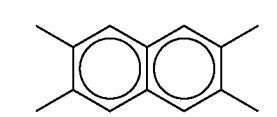
(X-4)

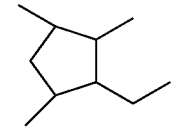
(X-5)

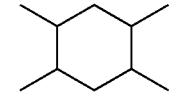
(X-6)

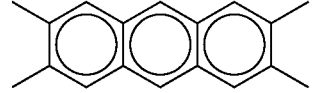
(X-7)

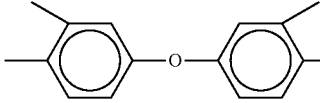
(X-8)

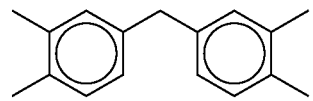
(X-9)

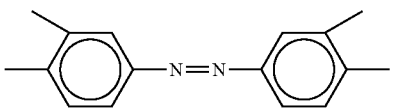
(X-P1)

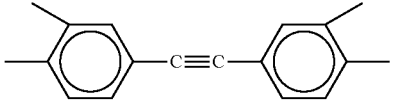
(X-P2)

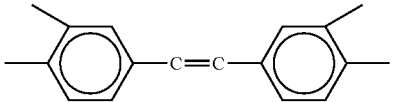
(X-P3)

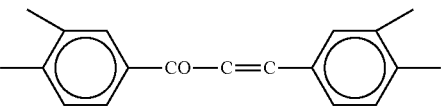
(X-P4)

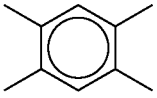
(Y-1)

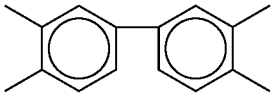
(Y-2)

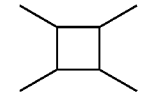
(Y-3)

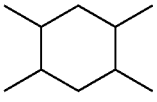
(Y-4)

(Y-5)

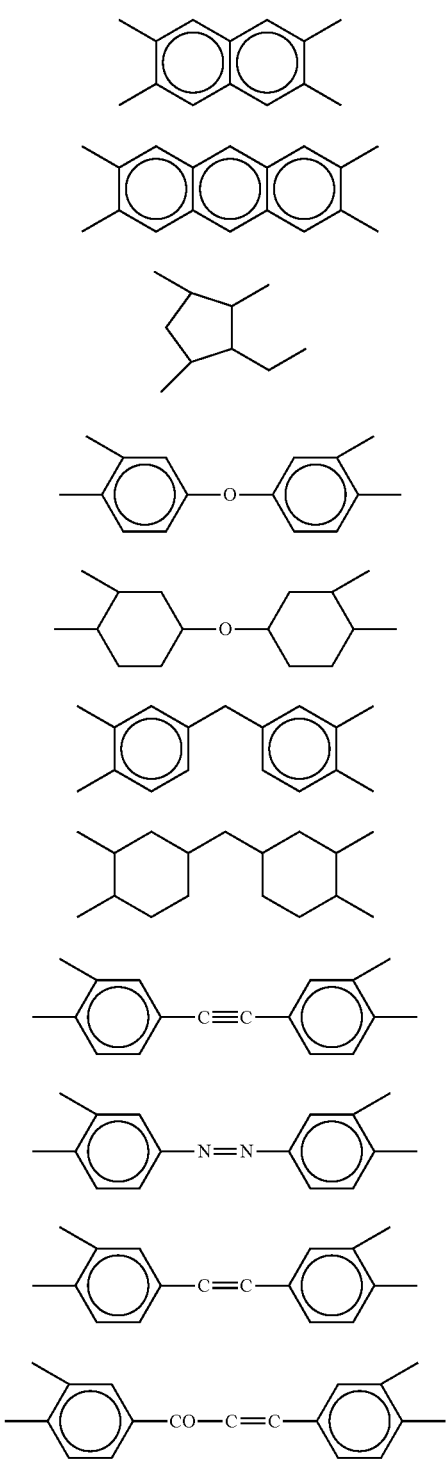
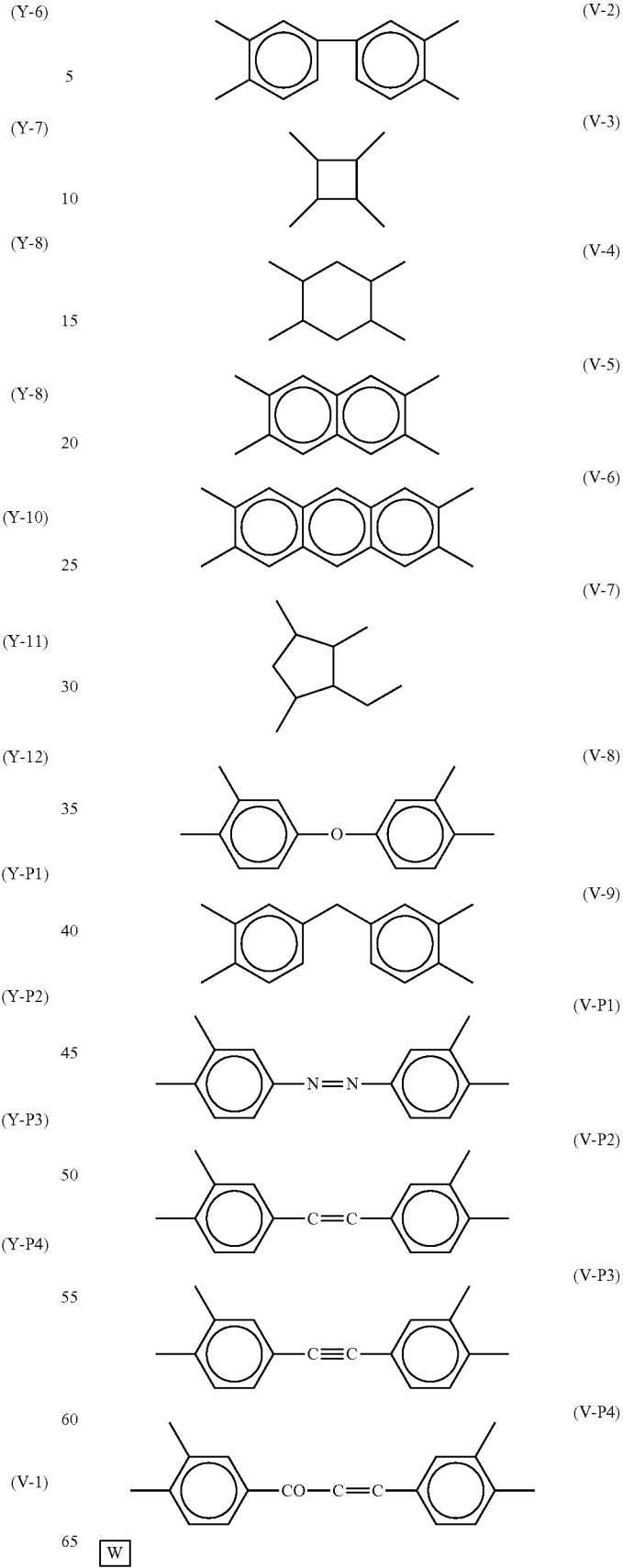
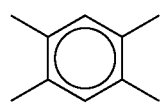

-continued
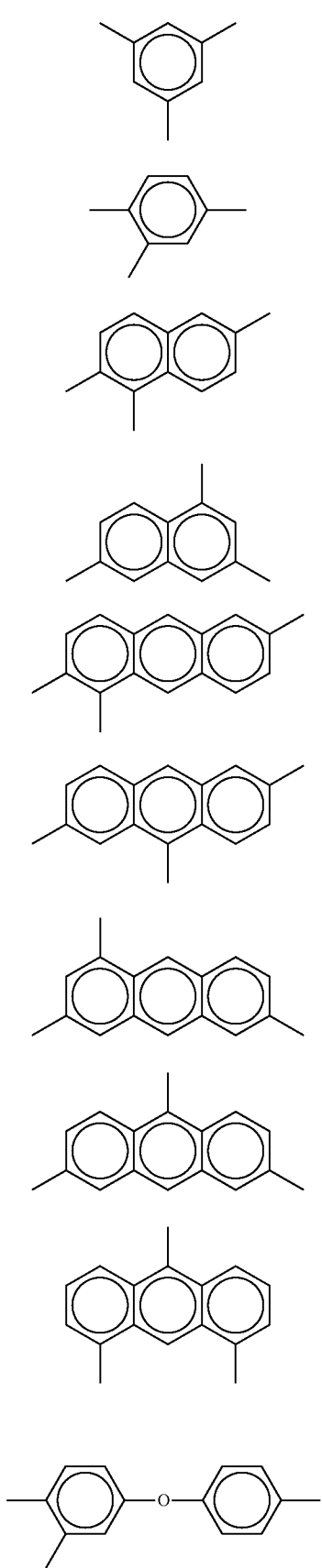
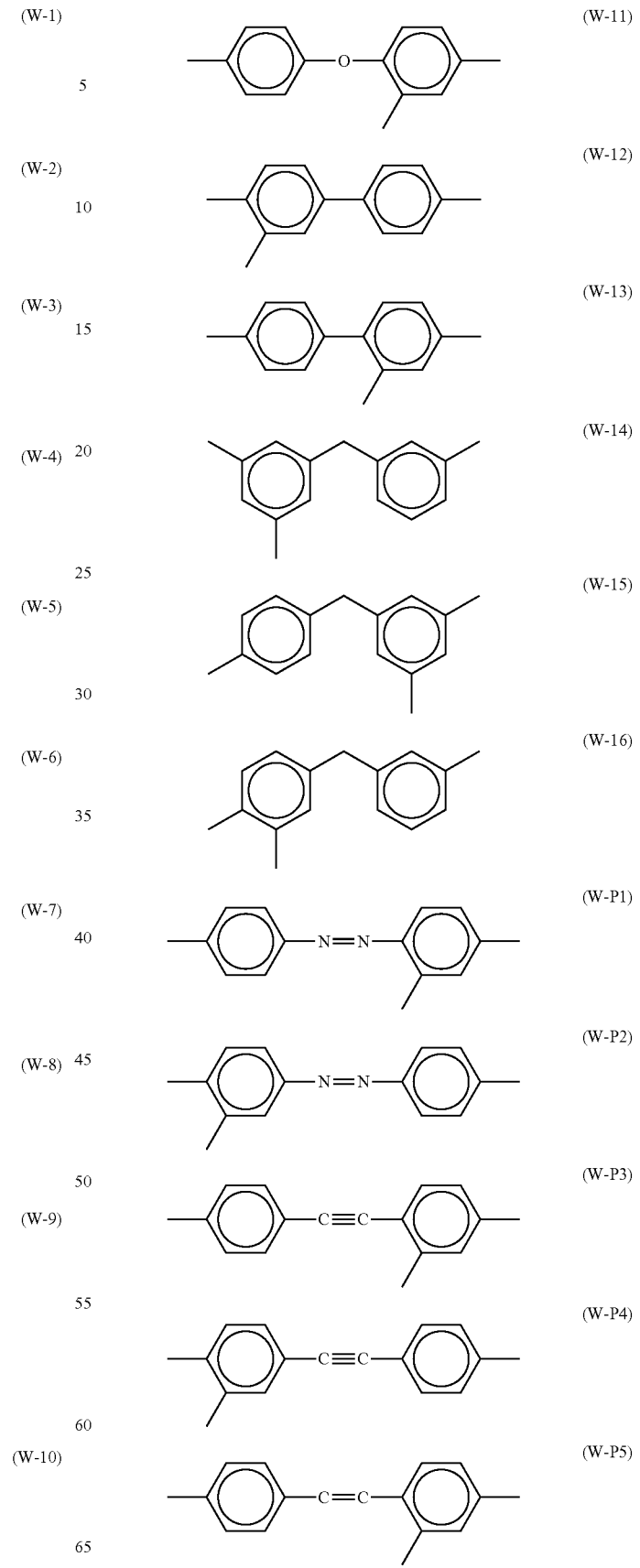

-continued

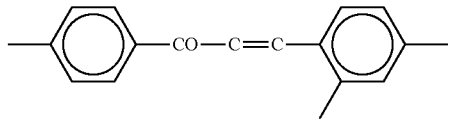
(W-P6)

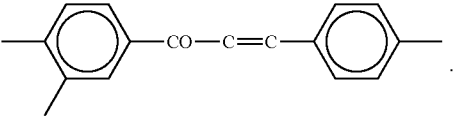
(W-P7)

(W-P8)
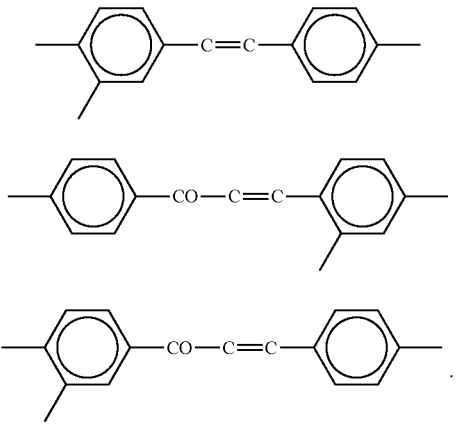

4. The alignment film according to claim 3, wherein R is a structure represented by the following formula (R-H1), (R-H2), (R-H3), (R-H4), (R-H5), (R-H6), (R-H7), or (R-H8)

—H  (R-H1)

—CH₃  (R-H2)

—C₂H₅  (R-H3)

—CF₃  (R-H4)

(R-H5)

(R-H6)

(R-H7)

(R-H8)

5. The alignment film according to claim 3, wherein R is a structure represented by the following formula (R-V1), (R-V2), (R-V3), (R-V4), (R-V5), (R-V6), or (R-V7)

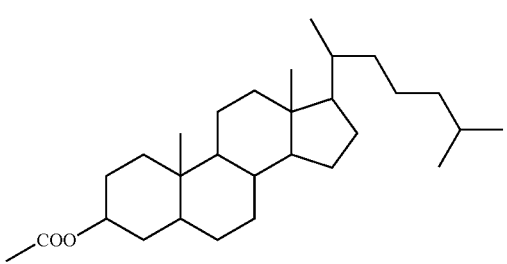
(R-V1)

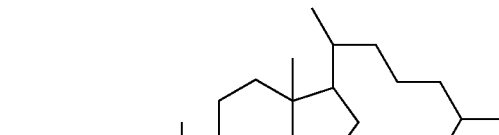
(R-V2)

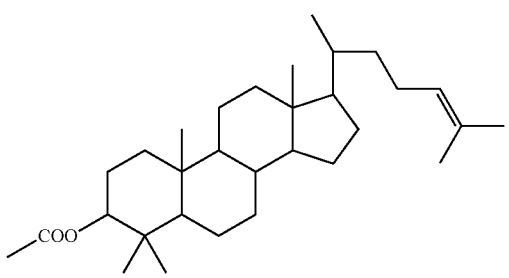
(R-V3)

(R-V4)

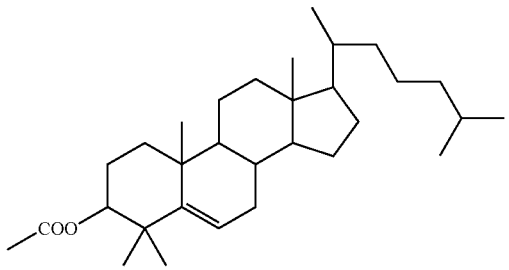

(R-V5)

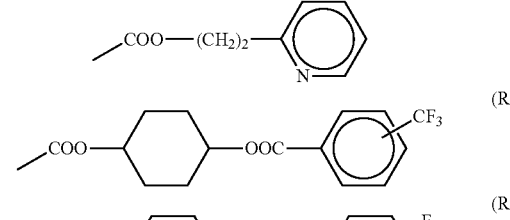
(R-V6)

(R-V7)
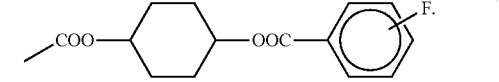

6. The alignment film according to claim 3, wherein R contains a photo-reactive functional group.

7. The alignment film according to claim 6, wherein the photo-reactive functional group is any of a cinnamate group, a chalcone group, an azobenzene group, a coumarin group, a tolane group, and a stilbene group.

8. The alignment film according to claim 7, wherein the photo-reactive functional group is a structure represented by the following formula (R-HP1) or (R-HP2)

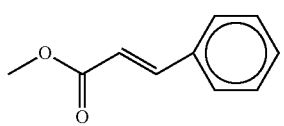
(R-HP1)

-continued
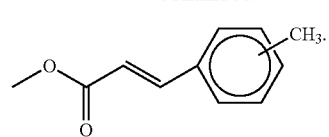
(R-HP2)
9. The alignment film according to claim 7, wherein the photo-reactive functional group is a structure represented by the following formula (R-VP1), (R-VP2), (R-VP3), (R-VP4), (R-VP5), (R-VP6), (R-VP7), (R-VP8), (R-VP9), (R-VP10), (R-VP11), (R-VP12), (R-VP13), (R-VP14), (R-VP15), (R-VP16), (R-VP17), (R-VP18), (R-VP19), (R-VP20), or (R-VP21)
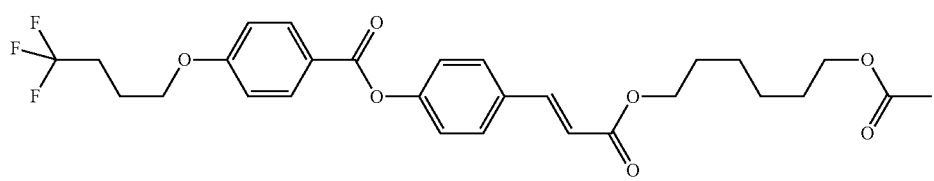
(R-VP1)
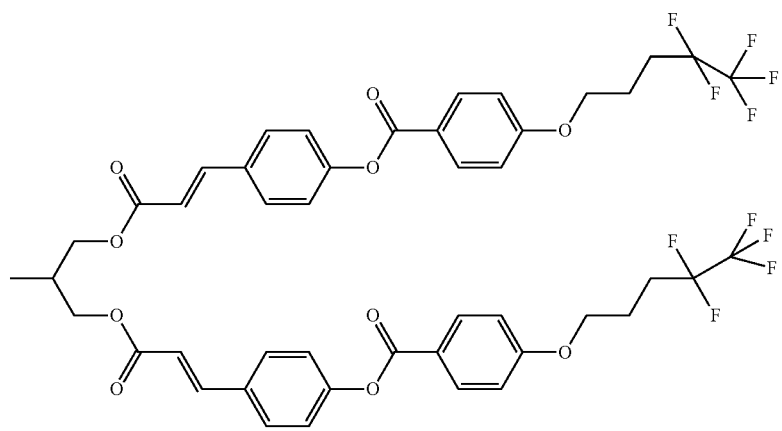
(R-VP2)
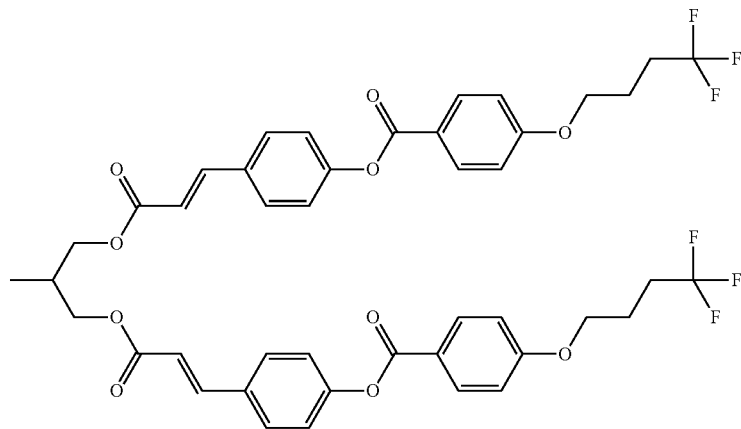
(R-VP3)
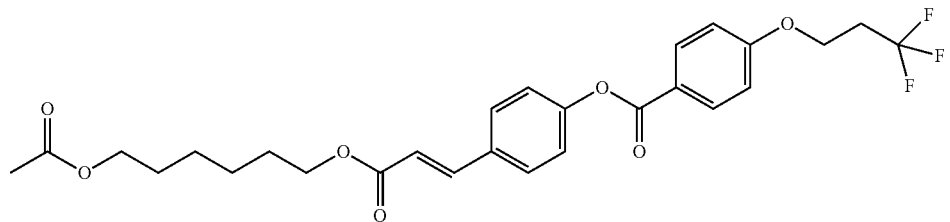
(R-VP4)

-continued
(R-VP5)
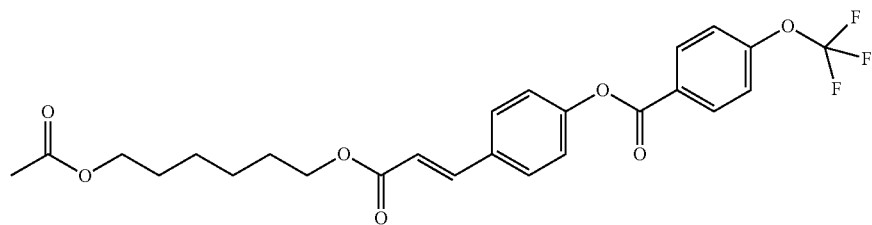
(R-VP6)
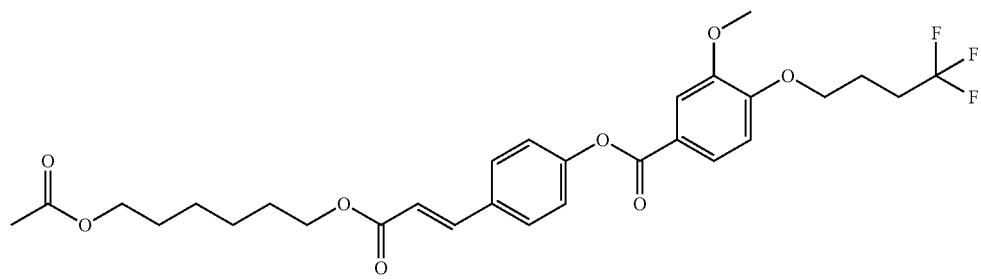
(R-VP7)
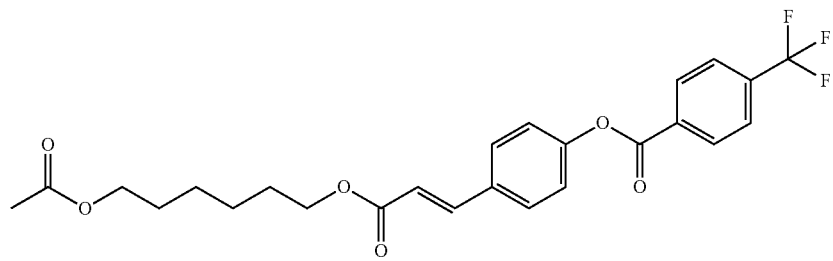
(R-VP8)
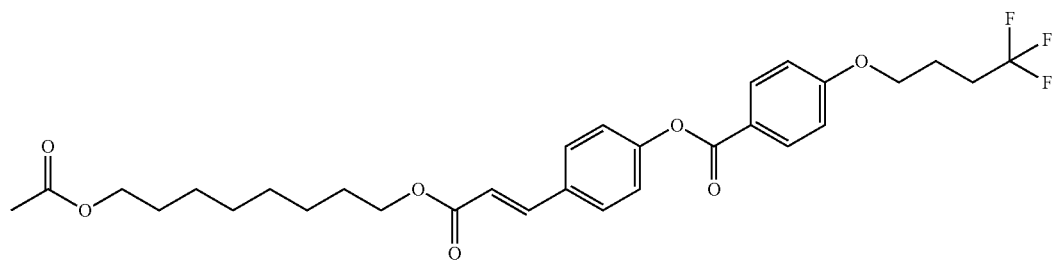
(R-VP9)
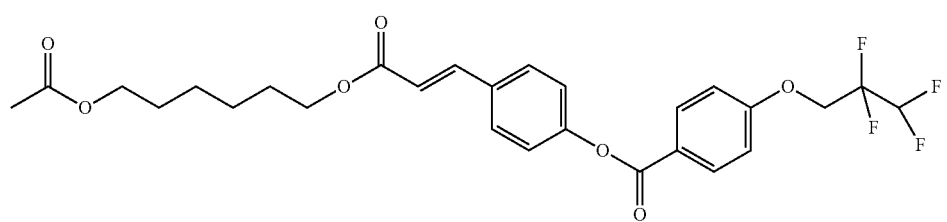
(R-VP10)
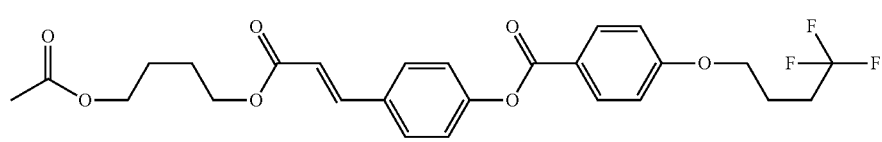
(R-VP11)
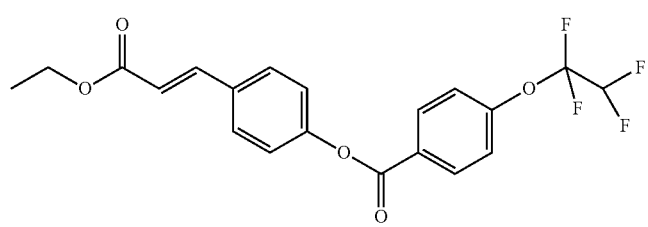

-continued
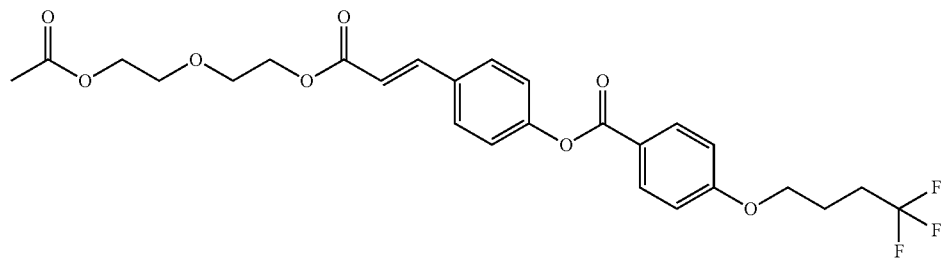
(R-VP12)
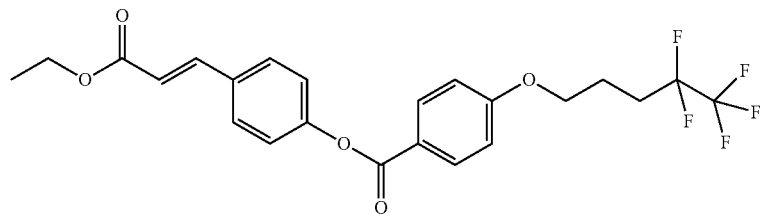
(R-VP13)
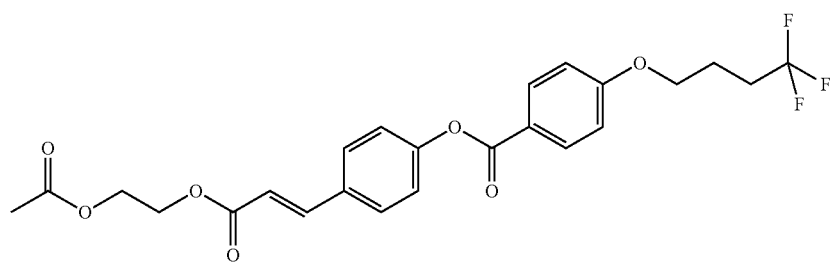
(R-VP14)
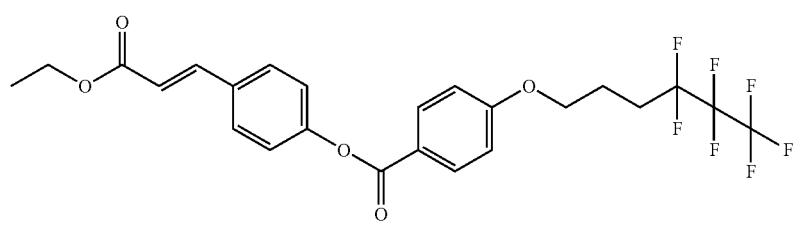
(R-VP15)
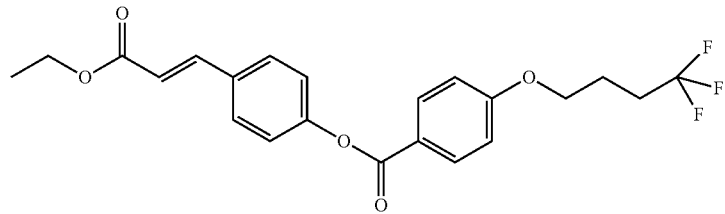
(R-VP16)
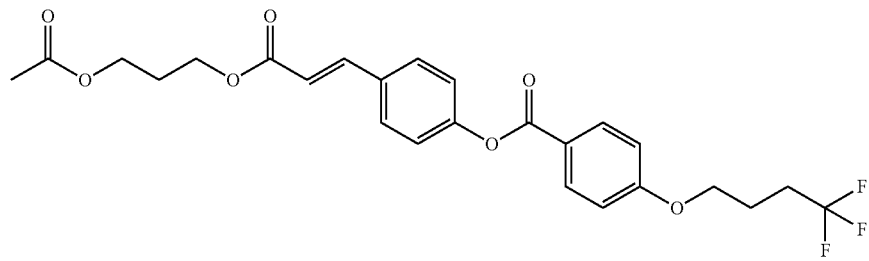
(R-VP17)

-continued
(R-VP18)
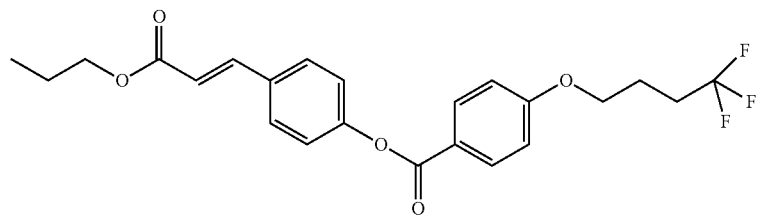
(R-VP19)
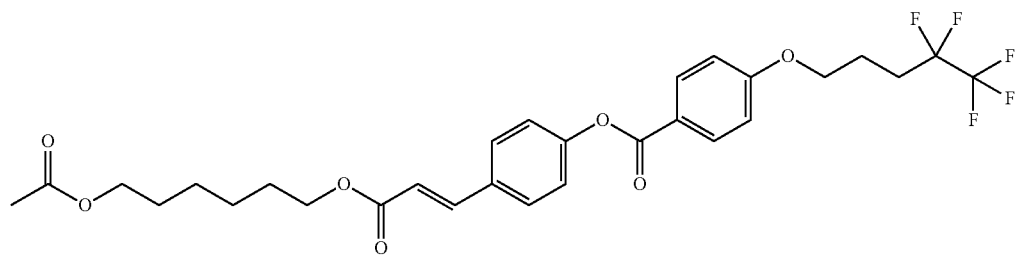
(R-VP20)
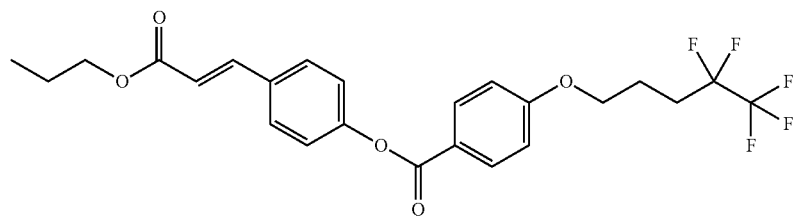
(R-VP21)
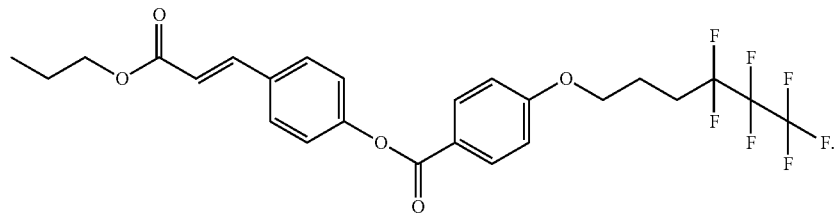
* * * * *